United States Patent [19]
McCool et al.

[11] Patent Number: 5,835,959
[45] Date of Patent: Nov. 10, 1998

[54] MEMORY MANAGEMENT SYSTEM AND METHOD USING DUAL INDEXING STRUCTURES

[75] Inventors: Michael W. McCool, Pasadena, Calif.; Scott J. Kurman, Wenatchee, Wash.

[73] Assignee: Sand Technology Systems International, Inc., Westmount, Canada

[21] Appl. No.: 565,862

[22] Filed: Dec. 1, 1995

Related U.S. Application Data

[60] Provisional application No. 60/003,117 Aug. 31, 1995.
[51] Int. Cl.$^6$ .................................................. G06F 12/08
[52] U.S. Cl. ......................................... 711/171; 711/173
[58] Field of Search ..................... 395/497.01, 497.02, 395/497.03, 497.04, 621, 416, 417, 418

[56] References Cited

U.S. PATENT DOCUMENTS

| | | | |
|---|---|---|---|
| 3,596,257 | 7/1971 | Patel | 340/497.02 |
| 4,907,151 | 3/1990 | Bartlett | 395/493 |
| 5,109,336 | 4/1992 | Guenther et al. | 395/497.02 |
| 5,249,265 | 9/1993 | Liang | 395/356 |
| 5,339,411 | 8/1994 | Heaton, Jr. | 395/497.02 |
| 5,481,702 | 1/1996 | Takahashi | 395/621 |
| 5,561,785 | 10/1996 | Blandy et al. | 395/497.01 |
| 5,561,786 | 10/1996 | Morse | 395/497.01 |
| 5,577,243 | 11/1996 | Sherwood et al. | 395/607 |

OTHER PUBLICATIONS

Byte, vol. 14, Issue 8, Aug. 1989, Grehan, "If Memory Serves . . . ", pp. 279–280, 282, 284, and 337.

Byte, vol. 15, Issue 9, Sep. 1990, Grehan, "Virtually Virtual Memory", pp. 455–456, 458, 460, 462, and 464.

"Structured Computer Organization", Second Edition, 1984, Andrew S. Tanenbaum, pp. 308–341.

"The Art of Computer Programming", Fundamental Algorithms, vol. 1, Second Edition, 1973, D.E. Knuth, pp. 442–445.

*Primary Examiner*—Eddie P. Chan
*Assistant Examiner*—Kevin L. Ellis
*Attorney, Agent, or Firm*—Christie, Parker & Hale, LLP

[57] ABSTRACT

An embodiment of the present invention is a memory management system. A storage device is organized into at least one file comprising numbered data frames of stored data for swapping into a memory. Each frame contains storage blocks of space. A memory is connected to the storage device and comprises a cache comprising numbered pages for storing swapped frames and a page list heads list comprising at least one list head entry. Each numbered page contains data frames that contain memory blocks for data storage or header frames that contain frame meta data. Each such list head entry stores a page number identifying a first of the numbered pages that contains free memory blocks of a given block size. A processor is connected to the memory and comprises means for allocating the one memory block responsive to a memory request by looking up the numbered page identified by the page number stored in the one list head entry.

20 Claims, 23 Drawing Sheets

FIG.3

FRAME 3

```
        60         FHDR
AVAILMAP=0X0000 07D0
BOFFS[ ]={
      0X0000 0740, 0X0000 0000,
   62 0X0000 0840, 0X0000 0880,
      0X0000 0900, 0X0000 0A00,
      0X0000 0C00, 0X0000 0000,
      0X0000 0000, 0X0000 0000,
      0X0000 0000, 0X0000 0000,
      0X0000 0000, 0X0000 0000,
      0X0000 0000, 0X0000 0000,
      0X0000 0000, 0X0000 0000,
      0X0000 0000
```

00 10 20 30 40 50 60 70 80 90 A0 B0 C0 D0 E0 F0
XA000
XA100
XA200
XA300
XA400
XA500
XA600
XA700
XA800
XA900
XAA00
XAB00
XAC00
XAD00
XAE00
XAF00

45

FRAME 6

```
        60         FHDR
AVAILMAP=0X0000 0390
BOFFS[ ]={
      0X0000 0C10, 0X0000 0000,
   62 0X0000 0000, 0X0000 0080,
      0X0000 0100, 0X0000 0200,
      0X0000 0000, 0X0000 0000,
      0X0000 0000, 0X0000 0000,
      0X0000 0000, 0X0000 0000,
      0X0000 0000, 0X0000 0000,
      0X0000 0000, 0X0000 0000,
      0X0000 0000, 0X0000 0000,
      0X0000 0000
```

00 10 20 30 40 50 60 70 80 90 A0 B0 C0 D0 E0 F0
X3000                                                    30
X3100
X3200
X3300
X3400                                                    45
X3500
X3600
X3700
X3800
X3900
X3A00
X3B00
X3C00
X3D00
X3E00
X3F00

FRAME 7

```
        60         FHDR
AVAILMAP=0X0000 0810
BOFFS[ ]={
      0X0000 0740, 0X0000 0000,
   62 0X0000 0000, 0X0000 0000,
      0X0000 0000, 0X0000 0000,
      0X0000 0000, 0X0000 0800,
      0X0000 0000, 0X0000 0000,
      0X0000 0000, 0X0000 0000,
      0X0000 0000, 0X0000 0000,
      0X0000 0000, 0X0000 0000,
      0X0000 0000, 0X0000 0000,
      0X0000 0000
```

```
typedef struct
{
    BYTE   *p_data;    /*cache control array                              */
    FRAME  pframe;     /*pointer to the data space of the page            */
                       /*frame number for this page                       */
    PAGE   pnext;      /*link to next page in hash or free list           */
    PAGE   pprev;      /*link to previous page in hash or free list       */
    PPL    ppl;        /*links for pool specific page lists               */
}CACHE;
```

FIG.9

```
typedef struct        /*pooled page list entry                */
{
    PAGE nxt[MAX_BLKSIZ-1];   /*link to next page in lists    */
    PAGE prv[MAX_BLKSIZ-1];   /*link to previous page in lists*/
}PPL;
```

FIG.10

```
typedef struct fhdr                     /*frame header                        */
{
    UNIT32  availmap;
    UNIT16  boffs[MAX_BLKSIZ-1]         /*offsets to available blocks         */
    UNIT16  pool;                       /*frame's subpool                     */
    FRAME   fnext;
    FRAME   fprev;                      /*doubly linked list by pool          */
}FHDR;
```

FIG.11

```
typedef struct                          /*memory block header                 */
{
    UNIT16  p_succlink;                 /*pointer to successor block          */
    BITFLD  f_availtag  :1;             /*block available flag                */
    BITFLD  reserved    :7;             /*MUST BE ZERO                        */
    BITFLD  kval8       :8;             /*power of two block size(1-20)       */
    UNIT16  p_predlink;                 /*pointer to predecessor block        */
}BHDR;
```

PAGE pplheads[NUM_POOLS][MAX_BLKSIZ-1]; /*list heads for PP lists */

FIG. 12

UNIT pdb[NUM_POOLS][MAX_BLKSIZ-1]; /*pool disk blocks */

FIG. 13

REMOVE PAGE FROM PPL PROCEDURE

SCAN THE PDB PROCEDURE

ADJUST THE PDB PROCEDURE

UPDATE THE PDB PROCEDURE

MEMORY MANAGEMENT SYSTEM AND METHOD USING DUAL INDEXING STRUCTURES

CROSS-REFERENCE TO RELATED APPLICATION

This application claims priority of U.S. provisional patent application Ser. No. 60/003,117 filed Aug. 31, 1995 entitled "Memory Management System and Method."

FIELD OF THE INVENTION

The present invention relates to a memory management system and method, and in particular, to a memory management system and method for allocating a memory block in a hierarchically organized memory in constant time.

BACKGROUND OF THE INVENTION

Physical memory size in every computer system is finite, whether the memory is cache, main memory or secondary storage. However, data-intensive applications, such as database management systems, must operate on data files that are maintained in secondary storage whose total size vastly exceeds the capacity of the cache or main memory. Virtual memory has evolved as one solution to providing access to these infinitely large files despite limitations imposed by physical memory hardware.

In a typical virtual memory system, the file is broken up into individual identically sized frames, each of which can easily fit within the confines of the main memory. A section of the main memory is partitioned into a swap space that contains a number of identically sized pages for storing selected frames into. The frames and pages have the same size so that each page is capable of containing one frame. Frames are dynamically loaded into the pages upon demand by an application program and are swapped out to secondary storage when the page is needed for loading in another frame. Virtual memory is discussed generally in A. S. Tanenbaum, *Structured Computer organization*, pp. 308–41, Prentice-Hall (2d ed. 1984).

Each particular frame can contain allocated memory blocks or unallocated memory blocks, that is, free space. Virtual memory does not provide an efficient way of allocating this randomly distributed free space for storage of data items having variable sizes generated during program execution. It only deals with the problem of loading into main memory requested frames from a file that is itself too large to efficiently fit into main memory. Therefore, there is a need for a scheme to dynamically allocate available memory blocks located in the frame space in variable sized portions for use by an application program.

One scheme for dynamically allocating memory blocks for data item storage is known as the "Buddy Block System" as described in D. E. Knuth, *The Art of Computer Programming*, vol. 1, pp. 442–45, Addison-Wesley (1973). Each frame is divided into proportional, fixed sized memory blocks each having a size that is a power of 2. Memory blocks are dynamically allocated only in one of these predetermined sizes. Excess space is wasted if the allocated memory block size is larger than the size requested.

Each frame is associated with a header structure for describing the attributes of the frame. The frame headers are doubly linked together into a list which has as many frame headers as the file has frames. Furthermore, each frame can have as many linked lists of memory block headers as the frame has memory block sizes. The list heads for these memory block lists are contained in the frame header. Each frame header also contains an availability bitmap to indicate what memory block sizes are free within the frame. The frame headers are physically grouped together forming "header" frames and should be distinguished from data frames as they play a major role in limiting performance.

There are two problems with this memory allocation scheme. First, the scheme is space efficient but time inefficient. As the file size increases, that is, as the number of data frames increases, proportionately fewer header frames of the file will reside in the swap space, thereby causing an increase in the time required to perform space allocation due to an ever increasing number of input and output (I/O) operations fetching header frames. Thus, the scheme takes a proportionately longer amount of time to allocate memory blocks as the virtual memory expands. To find a free memory block, the smallest power of 2 memory block size that is at least as large as the memory size requested is first selected. The linked list of frame headers is scanned causing header frame I/O and each availability bitmap is examined to locate a frame containing a free memory block of the desired power of 2 size. The entire linked list is searched until a free memory block is found. If no block is found, the next power of 2 memory block size is selected and the scan repeated. This entire process is repeated until a free memory block is found. If no memory block is found, a new frame is created and a new memory block allocated. The data frames are not consulted during this operation. only header frames are inspected.

Second, thrashing can occur. only some of the header frames are stored in main memory and those needed during a scan must be swapped into main memory. If multiple scans are needed to find a free memory block, header frames will be swapped back and forth until the memory request is satisfied. This results in serious performance degradation.

Therefore, there is a need for a system and method for managing a request for a free memory block located in a data frame in constant time, thereby avoiding the need to repeatedly scan the full frame header block lists until a free memory block is found.

SUMMARY OF THE INVENTION

The present invention enables the above problems to be overcome by providing a memory management system and method for providing a free memory block in constant time.

An embodiment of the present invention is a memory management system for a memory. A storage device is organized into at least one file comprising numbered frames of stored data (and meta data) for swapping into the memory. Each data frame contains storage blocks of space. The memory is connected to the storage device and comprises a cache comprising numbered pages for storing swapped frames and a page list heads list comprising at least one list head entry. Each numbered page contains a frame comprised of memory blocks for data storage. Each such list head entry contains a page number identifying the first of the (possibly many) numbered pages that contains a frame having at least one free memory block of a given block size. A processor is connected to the memory and comprises means for allocating the one memory block responsive to a memory request by looking up the numbered page identified by the page number stored in the one list head entry.

An embodiment of the present invention is also a method using a computer for managing a memory organized into a plurality of layers. A memory request comprising a requested size of memory space is generated in a service layer responsive to an application program. The memory request is received from the service layer in a memory manager layer. Free memory space is allocated by locating a free memory block at least as large as the requested size in constant time and returning an address for the located memory block to the service layer.

An embodiment of the present invention is also a method using a computer for managing a memory. The computer comprises a storage means for storing a file comprising a plurality of frames and a cache connected to the storage means for storing frames swapped into the memory in pages. A page list is maintained in the memory comprising a plurality of page entries. Each such page entry contains a number identifying one of the pages that is storing a frame having free space of a given block size. A disk block list is maintained in the memory comprising a plurality of count entries. Each such count entry contains a count of frames in the storage means that have free space of the given block size.

An embodiment of the present invention is also a method using a computer for allocating a memory block having a requested size in constant time. The computer comprising a cache comprising numbered pages for storing swapped frames of stored data and a page list heads list comprising at least one list head entry. Each numbered frame containing memory blocks for data storage. Each such list head entry storing a page number identifying the first of the (possibly many) numbered pages that contains a frame having at least one available memory block of a given block size. The page list heads list is scanned responsive to a memory request to obtain a page number matching the numbered page that contains at least one available memory block at least as large as the requested size. A memory block offset is determined for the one memory block relative to a starting location for the frame. The one memory block is allocated by updating the page list heads list.

An embodiment of the present invention is also a method using a computer for managing a partitioned memory. The computer comprises a memory connected to a storage device. The storage device is organized into at least one file comprising numbered data frames of stored data (and header frames) for swapping into the memory. The memory is partitioned into a cache comprising numbered pages for storing swapped frames. Each numbered page contains either one of the frames which contains memory blocks of storage space or a header frame. A page list heads list is formed comprising at least one list head entry. Each such list head entry stores a page number identifying the first of the numbered pages that contains at least one available memory block of a given block size. The one memory block is allocated responsive to a memory request by looking up the numbered page identified by the page number stored in the one list head entry.

Still other embodiments of the present invention will become readily apparent to those skilled in the art from the following detailed description, wherein is shown and described only embodiments of the invention by way of illustration for the best modes contemplated for carrying out the invention. As will be realized, the invention is capable of other and different embodiments and its several details are capable of modification in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3 is a block diagram of frames, availability bitmaps and free memory blocks in the memory;

FIG. 8 is a data structure of a page of a cache control array element;

FIG. 9 is a data structure of a pooled page list element;

FIG. 10 is a data structure of a frame header element;

FIG. 11 is a data structure of a memory block header element;

FIG. 12 is a data structure of a pooled page list heads list;

FIG. 13 is a data structure of a pooled disk blocks list;

DETAILED DESCRIPTION

I. Definition of Terms

"Record": refers to a fixed sized data item stored on a physical storage device, such as a disk subsystem. A collection of records is referred to as a file.

"Frame": refers to a unit of interchange in a paging system, such as a record, swapped between a memory and the physical storage device.

"Page": refers to physically addressable storage space located within the memory for storing a frame.

"Memory block": refers to virtually addressable storage space within a frame.

"Disk block": refers to a "memory block" that is on the physical storage device and not in memory.

"Cache": refers to a collection of identically sized pages for storing swapped frames in a paging system.

"Pool": refers to a logical partitioning of the data frames into subpools for defining homogeneous subcollections of storage space.

"Pooled page list": refers to a collection of page references forming a doubly linked list for indicating an in-memory frame having a free memory block of a predetermined size. There is one pooled page list for each memory subpool (defined hereinbelow) and for every block size.

"Pooled list heads list": refers to a collection of page references in the cache for identifying the heads of each pooled page list.

"Pooled disk blocks list": refers to a collection of counts of partially allocated frames which are not currently in memory. There is one pooled disk block list for each memory subpool and for every block size.

II. Overview

Figure 2:
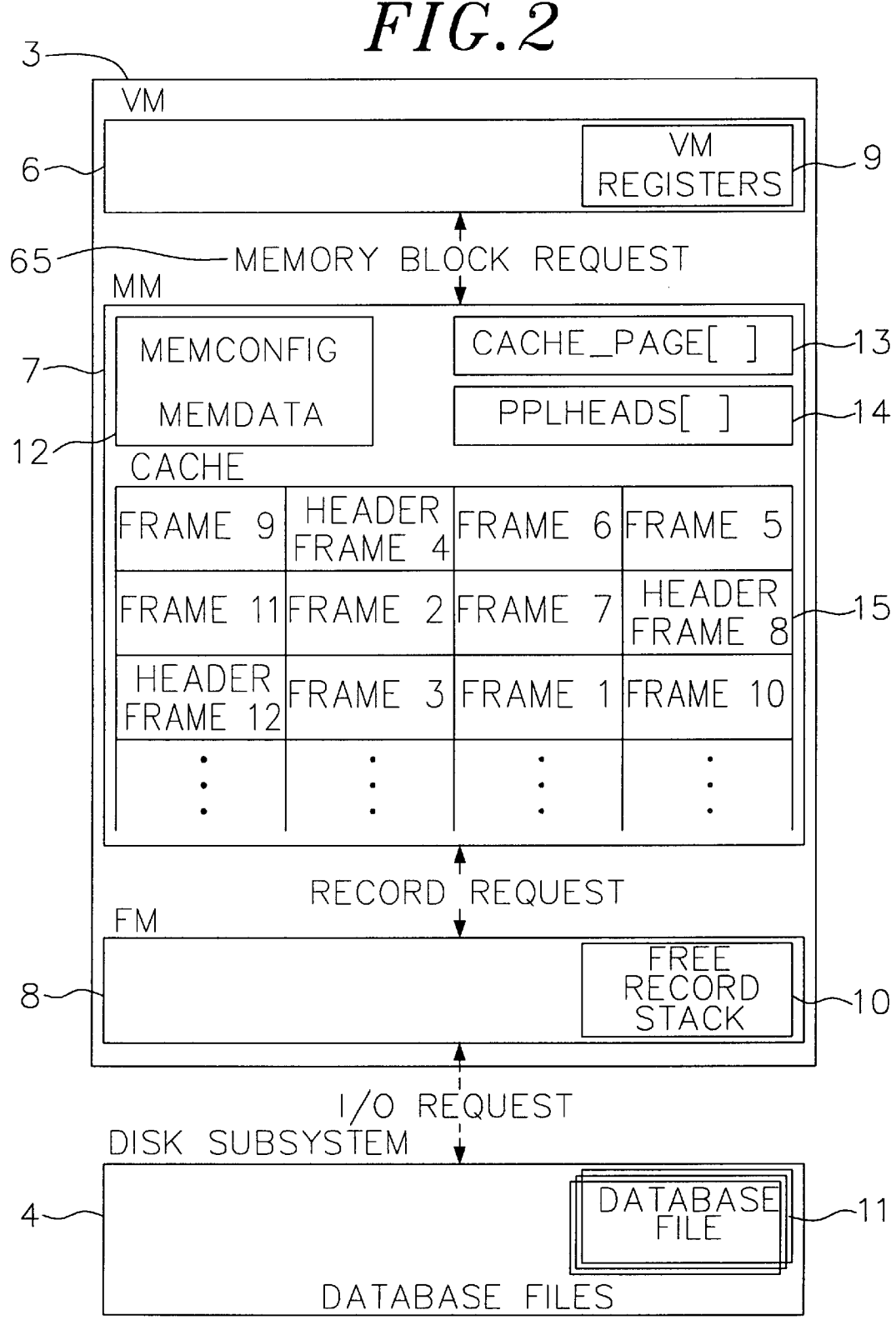
FIG. 2 is a block diagram of the memory and disk subsystem components of the memory management system shown in FIG. 1.
Figure 4:
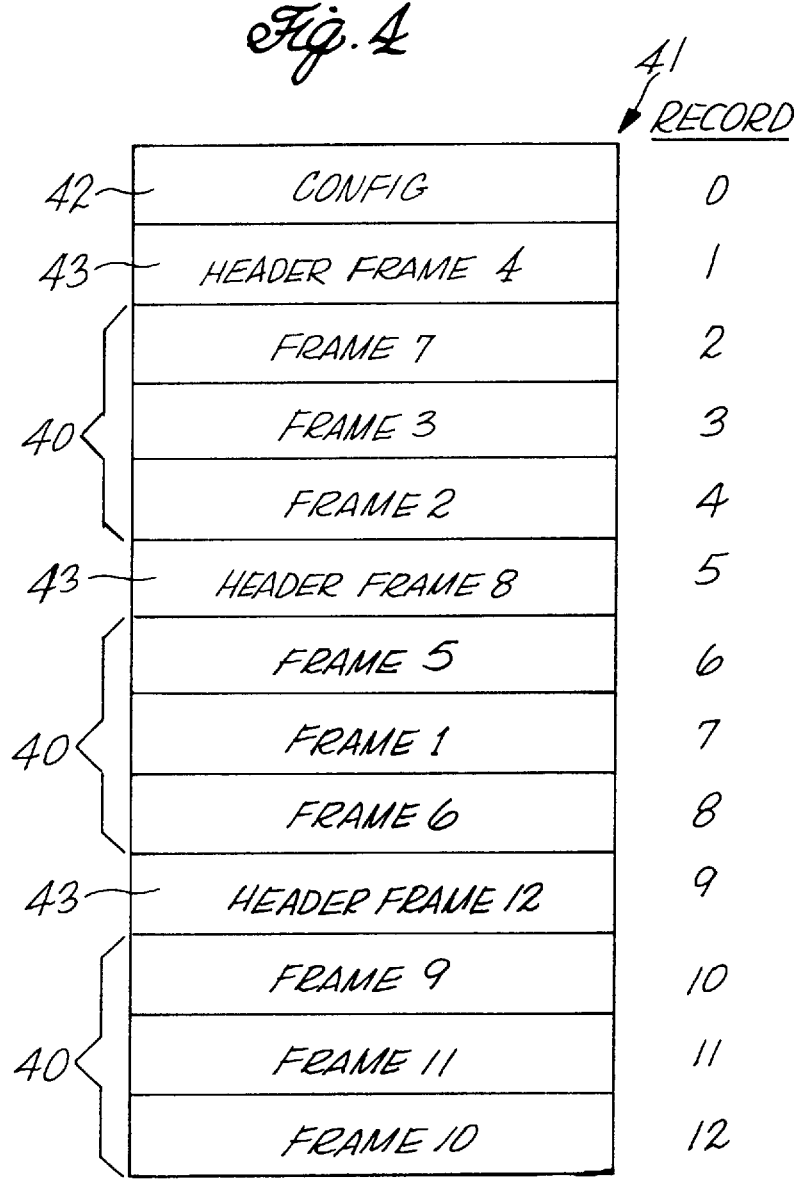
FIG. 4 is a block diagram of a database file.
Figure 5:
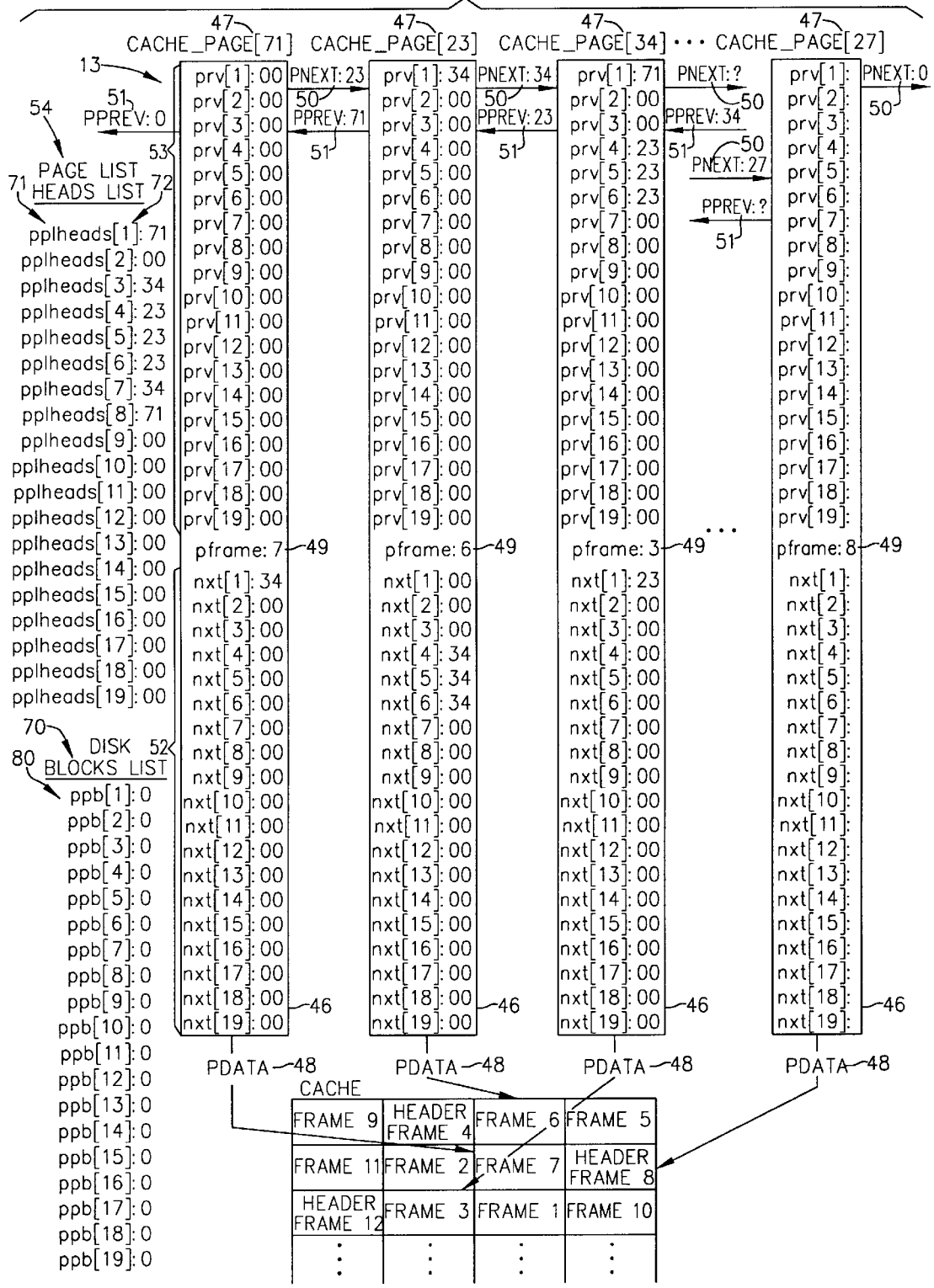
FIGS. 5 and 6 are block diagrams of the cache, a pooled page list head list and a pooled disk blocks list in accordance with the present invention.

An embodiment of the present invention provides direct access in constant time to a free memory block by scanning a pooled page list heads list 54, as shown in FIG. 5 (discussed in more detail hereinbelow). The memory management and memory system 1 merely scans the pooled page list heads list 54 of FIG. 5, to find an entry 71 storing the number 72 of a page 46 in the memory 3 containing a frame 40 (FIG. 4) having a desired memory block 45 size at least as large as that required for a memory request 65 (FIG. 2). If no pooled page list heads list entry 71 indicating a free memory block of sufficient size is found, the Memory Manager 7 scans a pooled disk blocks list 70 to find an entry 80, therein storing a non-zero count 81 (FIG. 6) indicating that some partially allocated frames 40 on disk 4 have a suitably sized free memory block 45. If no pooled disk blocks list entry 71 is found, a new frame 40 is created to satisfy the memory request. Since only the head element of these lists is examined, the scan takes a constant amount of time and, in the worst case, requires one look up per memory block size (which is still constant time behavior). In the described embodiment, there are 20 memory block sizes by way of example.

III. System Components

A particular type of application program that the present invention is particularly suited for is a database management system. Database files tend to be voluminous and there is consequently a need to swap the database frames between the main memory and disk subsystem and to make efficient use of free space in the frames that can either be in the main memory or on the disk subsystem, that is, not in memory.

Figure 1:
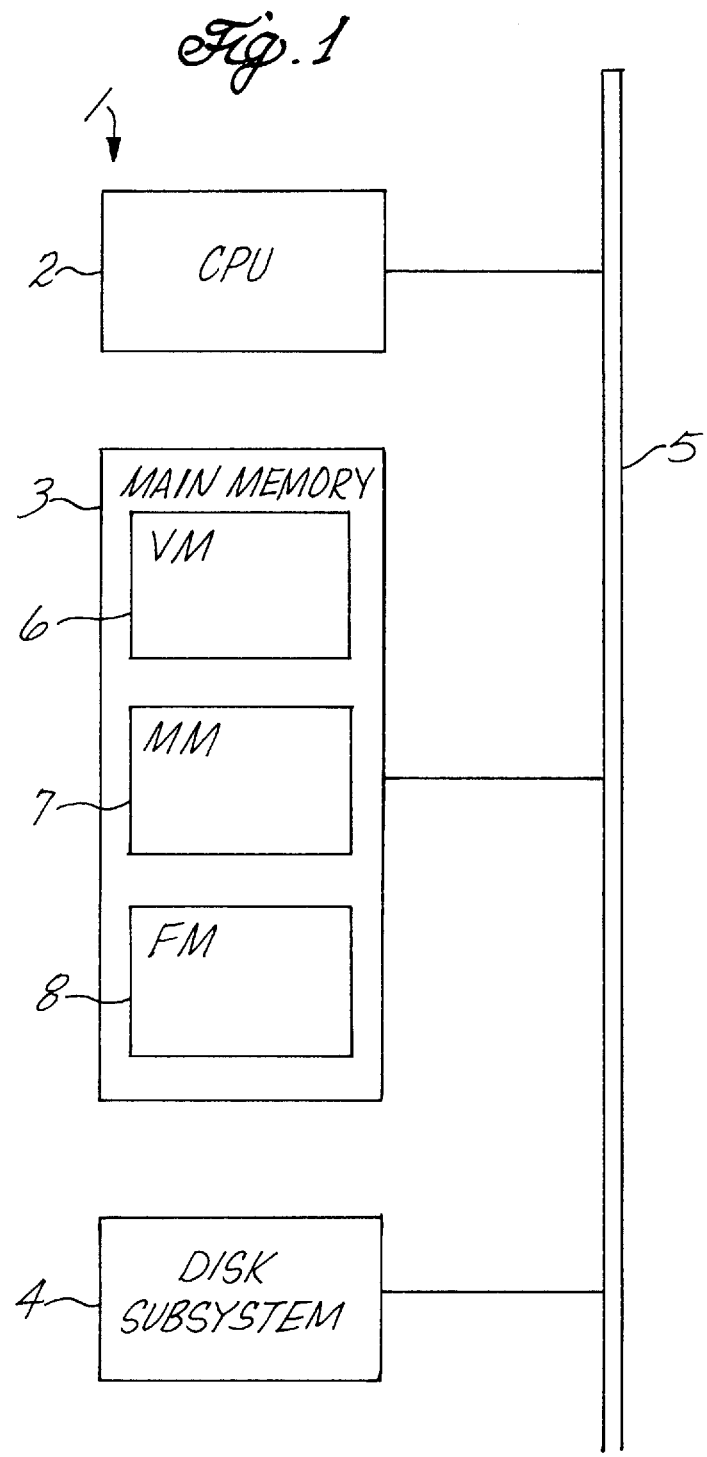
FIG. 1 is a functional block diagram of a memory management system in accordance with the present invention.

The memory management and memory system 1 of FIG. 1 comprises a central processing unit (CPU) 2, a main memory 3 and a disk subsystem 4 connected over a common bus 5. These components perform the usual functions generally associated with a general purpose programmed digital computer. More specifically, the CPU executes instructions according to a computer program. The disk subsystem provides a physical storage device for large files used by application programs. The main memory stores the computer program during execution and data items that are read in from the disk subsystem. The main memory capacity is significantly smaller than the disk subsystem capacity. Transfers of data items between the main memory and disk subsystem are initiated by the CPU under computer program control but the actual loading and unloading of data items into or from the main memory can be effected by the CPU, a direct memory access (DMA) controller (not shown) or other similar device.

An exemplary example of a computer system suitable for embodying the memory management system of the present invention is a DEC 3000 Model 800 equipped with a 175 Mhz EV4 CPU chip, part no. 21064, with 640 megabytes of random access memory and 10 gigabytes of secondary storage, manufactured by Digital Equipment Corporation, Maynard, Mass.

IV. Memory Management Components

Referring to FIG. 2, the main memory 3 is hierarchically organized into three functional layers: Vector Manager (VM) 6, Memory Manager (MM) 7 and File Manager (FM) 8. These components in conjunction with the CPU 2 will now be described.

A. Vector Manager, File Manager and Disk Subsystem

Vector Manager 6 provides a service layer to an application program. In the described embodiment, this is a database management system. A plurality of general VM registers 9 are provided for storing information about vectors 15 in memory 3.

File Manager 8 provides a record-based I/O interface to the disk subsystem 4. A Last-In/First-Out free record stack 10 is maintained for buffering newly allocated or freed records being transferred between the main memory and the disk subsystem.

Finally, the disk subsystem 4 provides persistent, non-volatile storage of database files 11. The low level interfacing required to provide record-based access to the database files is provided by conventional operating system functions at the kernel (operating system) level.

Within the main memory 3, both the Vector Manager 6 and File Manager 8 interface to the Memory Manager 7. The Vector Manager 6 and Memory Manager 7 exchange memory block requests 65. A memory block request (65, FIG. 2) is issued via Vector Manager 6 identifying a desired amount of free space to be allocated for storing data in bytes. The Memory Manager 7 and File Manager 8 exchange record requests. There are four types of record requests: readrec( ), writerec( ), newrec( ) and freerec( ). The last two record requests interface to the free record stack. The File Manager 8 and disk subsystem 4 exchange I/O requests. There are three types of I/O requests: read( ), write( ) and seek( ).

B. Memory Manager

The Memory Manager 7 manages memory block requests 65 for variable sized memory blocks received from the Vector Manager and record requests for fixed sized record transfers from the File Manager 8. The components constituting the Memory Manager 7 can best be understood by first describing the overall memory organization scheme.

1. Memory Organization Scheme

Referring to FIG. 4, each database file stored in the disk subsystem is broken up into individual, identically sized data frames 40 which, by way of example, consist of 8 megabytes (MB) of data. A database file 41 comprising a configuration record ("Config") 42, header frames 43 (further described hereinbelow) and the data frames 40 is shown in FIG. 4. Swapped frames are stored in cache 15 of memory 3. The cache is, by way of example, partitioned into a plurality of numbered pages 47 with each page also being 8 MB in size. There are significantly more frames 40 in the database file in the disk subsystem 4 than pages in the cache 15.

Each particular frame 40 can contain free space where data has not been stored that can also be used by an application program for storage of data once the data frame is loaded into a page of cache 15. Referring to FIG. 3, each frame is subdivided into proportional, fixed sized memory blocks 45 in FIG. 3. Each memory block 45 has a size that is a power of 2 in the described embodiment. There are 20 block sizes available, ranging in size from 16 bytes through eight megabytes. The smallest 16-byte memory block is known as a paragraph and the memory blocks range in size from 1 through 512K paragraphs by powers of 2.

The block sizes, bytes and paragraphs in the described embodiment are summarized for ease of understanding in Table 1. Memory blocks 15 are dynamically allocated for use by the Vector Manager 6 only in one of these predetermined block sizes. Excess space is wasted if the allocated memory block size is larger than the size requested. The structure of the Memory Manager 7 will now be discussed.

2. Memory Manager Structure

Data structures in the C language for the components comprising the described embodiment of the present invention are presented in FIGS. 8–13.

a. Pages

Referring to FIGS. 2 and 5, each page 46 within the cache 15 can be used for storing a data frame 45 or a header frame 43 swapped in from the disk subsystem 4 through the File Manager 8. Each page 46 (of pages 13) is identified by a page number 47. In the described embodiment, the cache has $2^{32}$ pages and page numbers consequently range from 0 to $2^{32}-1$.

A data structure for a cache control array element for a page is shown in FIG. 8. The $2^{32}$ elements of the cache control data 15 are stored as an array 13 called "cache_page[ ]". Referring to FIGS. 5 and 8, each cache control array element contains five items. A pointer, p_data 48, stores an address for the data space of the page. The frame number of the frame stored in each page is stored in pframe 49. The individual array elements are further organized into a doubly linked list by using a link to the next page, pnext 50, and previous page, pprev 51, in the cache. Finally, a pair of links, ppl, for the next 52 and previous 53 pages in the pplheads list 54, described hereinbelow, is stored for each separate block size. A data structure for the ppl is shown in FIG. 9. It is the ppl data structure which provides the constant time allocation behavior.

b. Frames

The MEMCONFIG/MEMDATA section 12 ("MEMCONFIG") of memory 3 (FIG. 2) is used to store information about frames 40 and their free memory blocks 45. Information about all frames is made available by MEMCONFIG through the use of an array of disk locations for all header frames which thereby provides access to all frame headers. A data structure describing a frame header element is shown in FIG. 10 and comprises five items.

Referring to FIGS. 3 and 10, first, an availability bitmap, availmap 60, indicates whether a memory block of a specified block size is free in the corresponding frame by using a specific bit. There is one bit position within availmap 60 corresponding to each of the block sizes. The individual bit positions are summarized for ease of understanding in Table 2. By way of example, availmap is 32 bits long and the bit positions range from bit position 4 (corresponding to block size 1) through 23 (corresponding to block size 20). The availability bitmask in availmap for each block size and the corresponding bit positions are summarized for ease of understanding in Table 1. Non-available sizes are indicated by a 0-bit in availmap. If the frame has free memory blocks of different sizes, the availability bits are summed. For example, referring to FIG. 3, frame 6 has free memory blocks of sizes 1 and 4–6. The availability bitmasks for these block sizes (from Table 1) result in an availability bitmap calculated as follows:

| block size 1: | 0x00000010 |
| block size 4: | 0x00000080 |
| block size 5: | 0x00000100 |
| block size 6: | + 0x00000200 |
| availmap: | 0x00000390 |

Second, referring to FIGS. 3 and 10, each frame header also has a block offset list, boffs[ ] 62, organized by block size, again shown in FIG. 10. Each block offset entry indicates the relative location of the first free memory block of a selected block size within the frame. Additional free memory blocks of a given block size are then linked through the memory block header described later. Since a memory block of the maximum block size occupies the entire frame, it is unnecessary to maintain an offset within the block offset list for a maximum sized memory block.

Three examples of frames and their corresponding availability bitmaps and block offset lists are shown in FIG. 3. For clarity, only the first free memory block of each block size and the first 4096 bytes of each frame are shown, although each frame can contain more than one memory block of each size and is 8 MB in the described embodiment. Frame 3 has an availability bitmap of 0x000007D0. Referring to Table 1, this availability bitmap indicates that frame 3 has free memory blocks of sizes 1 and 3–7. Likewise, the availability bitmaps for frames 6 and 7, which are 0x00000390 and 0x00000810, respectively, indicate that those frames have free memory blocks of sizes 1, 4–6 and 1 and 8, respectively. Frame 3 has a block offset list showing that the first free memory block of size 1 has a relative offset of 0x00000740. Similarly, the first free memory blocks of sizes 3 through 7 have offsets of 0x00000840, 0x00000880, 0x00000900, 0x00000A00 and 0x00000C00, respectively. The block offset lists for frames 6 and 7 are similarly interpreted.

Lastly, each frame header element has three additional items. The memory space used by the application program in the described embodiment is logically partitioned into homogeneous collections of storage space known as pools. Each frame header contains a number of a pool, pool, identifying the frame's memory subpool. Finally, each frame has two pointers, fnext and fprev, forming a doubly linked list pointing to the next and previous, respectively, frames located in the assigned memory subpool.

c. Memory Blocks

Each frame consists of a set of memory blocks 45 which, by way of example, is a unit of memory whose sizes in bytes are exact powers of 2. The smallest block of memory is 16 bytes, known as a paragraph. The largest block of memory is 8 MB or the entire frame. There are twenty block sizes as shown in Table 1. The number of bytes n stored in each block size is defined by the equation:

$$n=2^{<blksiz>+3}$$

where <blksiz> is the block size of the memory block.

Each free memory block within a frame has a block header. A data structure for a memory block header is shown in FIG. 11. It comprises five items. The block headers are organized into a doubly linked list with one list for each different memory block size. The p_succlink and p_predlink variables store offsets to the successor and predecessor free memory blocks, respectively, of a given block size. A frame can have several free memory blocks of the same block size and therefore, block headers for same sized memory blocks located within the same frame are formed into doubly linked lists. These doubly linked lists are headed in the block offset list, boffs[ ], in the frame header. In each frame, there can be one linked list of free memory blocks for each different memory block size. Conversely, whenever no free memory blocks for a particular block size exist, there will not be a corresponding linked list as the boffs[ ] entry will be empty. Each memory block header also contains a flag, f_availtag, indicating that the memory block is free and a block size, kval8, indicating the power of 2 block size for a particular memory block.

d. Pooled Page List Heads List

The pooled page list heads list ("pplheads list") 14 contains the heads of the doubly linked pooled page lists that are threaded through the ppl fields in the cache control array, cache_page[ ] (shown in FIG. 8). The pplheads list is organized according to block size. A data structure for a pplheads list is shown in FIG. 12. Like the block offset list stored within each frame header (shown in FIG. 10), it is unnecessary to have an entry in the pplheads list for the maximum memory block size since this size of memory block requires an entire frame.

As further described hereinbelow, the pplheads list provides to the Memory Manager constant time access to a page containing a frame having a free memory block of a predetermined block size. For example, the seventh entry (corresponding to block size 7) of pplheads list, pplheads[7] (shown in FIG. 5) contains 34 (corresponding to the page indexed by page number 34) which indicates that a free memory block of block size 7 is in frame 3.

e. Header Table List

The pooled disk block list ("pdb list") 70 is stored in MEMCONFIG. A data structure describing the pdb list is shown in FIG. 13. Each element of the pdb list contains a count of the partially allocated frames on the disk subsystem having free memory blocks of a given block size. As further described hereinbelow, the pdb list is examined by the Memory Manager whenever a free memory block cannot be found in a frame currently residing in the cache.

f. Pool Heads List

Each memory subpool has a doubly linked list of frame headers. The heads of each of these lists are collected in the pool heads list ("poolheads list") which is stored in MEMCONFIG.

g. Header Table List

The frame headers are collected onto frames which are stored as records in the database file. These collections of frame headers are called header frames and their disk locations are recorded in the header table list ("hdrtable list") which is stored in MEMCONFIG. Access to the frame headers disk location in the hdrtable list is provided using the header frame number of the header as the index.

VI. Organizing a Memory Management System

Figure 7:
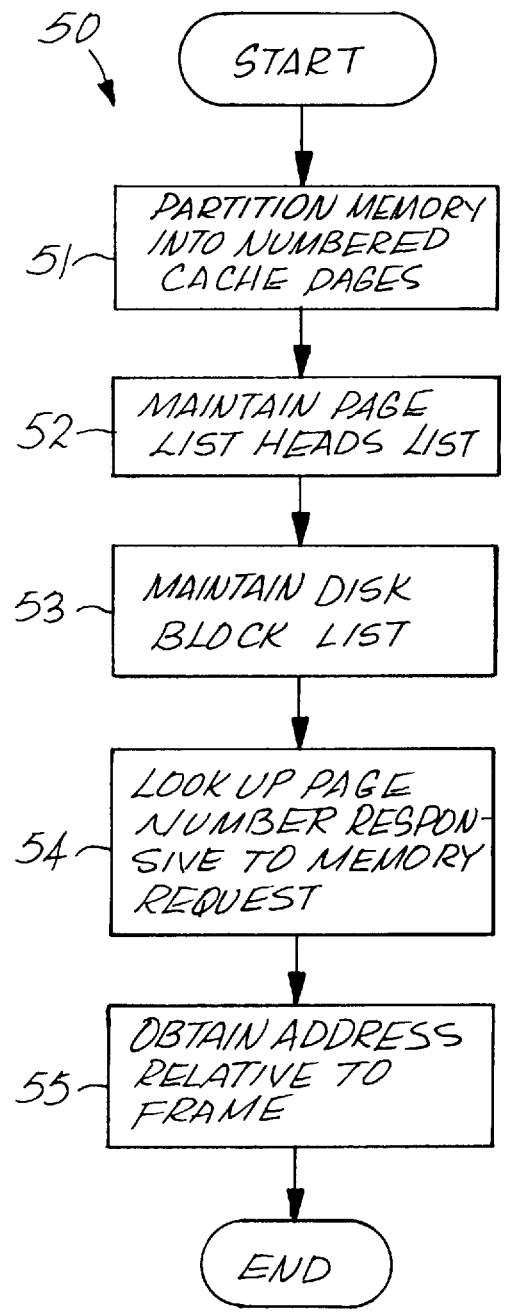
FIG. 7 is a flow diagram of a method for managing memory in accordance with the present invention.

A flow diagram summarizing the steps required to organize a memory management system in accordance with the present invention is shown in FIG. 7. First, the memory is partitioned into a plurality of numbered pages to form a cache for storing swapped frames (block 51). A pooled page heads list, referred to in the described embodiment as the pplheads list, is maintained for locating free memory blocks in frames residing in pages which is organized by block size (block 52). A disk block list, referred to in the described embodiment as the pdb list, is maintained for keeping a count of free memory blocks of a given block size located in frames on the disk subsystem (that is, frames not currently in cache) (block 52). A page number stored in each entry of the pooled page list is looked up responsive to a memory request from an application program (block 54) whereby the page number corresponds to a page in the cache containing a frame having a free memory block of one of the predetermined block sizes. Finally, an address for the memory block is calculated relative to the start of the page (block 55) which is returned to the application program to satisfy the memory request.

In the described embodiment, a database file in the disk subsystem is mounted and dismounted before and after program execution. During a mount operation, a permanent copy of the pdb list is copied to the memory from a database configuration record on the disk subsystem. Also, a permanent copy of the poolheads and hdrtable lists are copied to MEMCONFIG from the database configuration record. In addition, the pplheads list is initialized to zero. During swapping operations, the pplheads and pdb lists are updated by the Memory Manager as frames are swapped into and out of the cache. The operation of the Memory Manager will now be described.

V. Memory Block Allocation Examples

EXAMPLE 1

Assume that an application program requests a memory block of 100 bytes. Referring to Table 1, the smallest block size satisfying the memory request is block size 4 which contains 128 bytes or eight 16-byte paragraphs. The Memory Manager first attempts to satisfy the memory request by locating a memory block of block size 4 in a frame residing in the cache by scanning the pplheads list. Referring to FIG. 5, the fourth element (corresponding to block size 4) of the pplheads list (pplheads [4]) equals 23 which indicates that cache page 23 (cache_page[23]) contains a free memory block of block size 4 in frame 6 (pframe: 6). Referring to FIG. 3, the fourth element (corresponding to block size 4) of the block offset array (boffs[4]) contains the offset (0x000 0080) of the free memory block 30 of block size 4. The memory request is satisfied by returning the frame number (6), page number (23) and offset (0x00000080) to the requesting application program.

EXAMPLE 2

Figure 6:
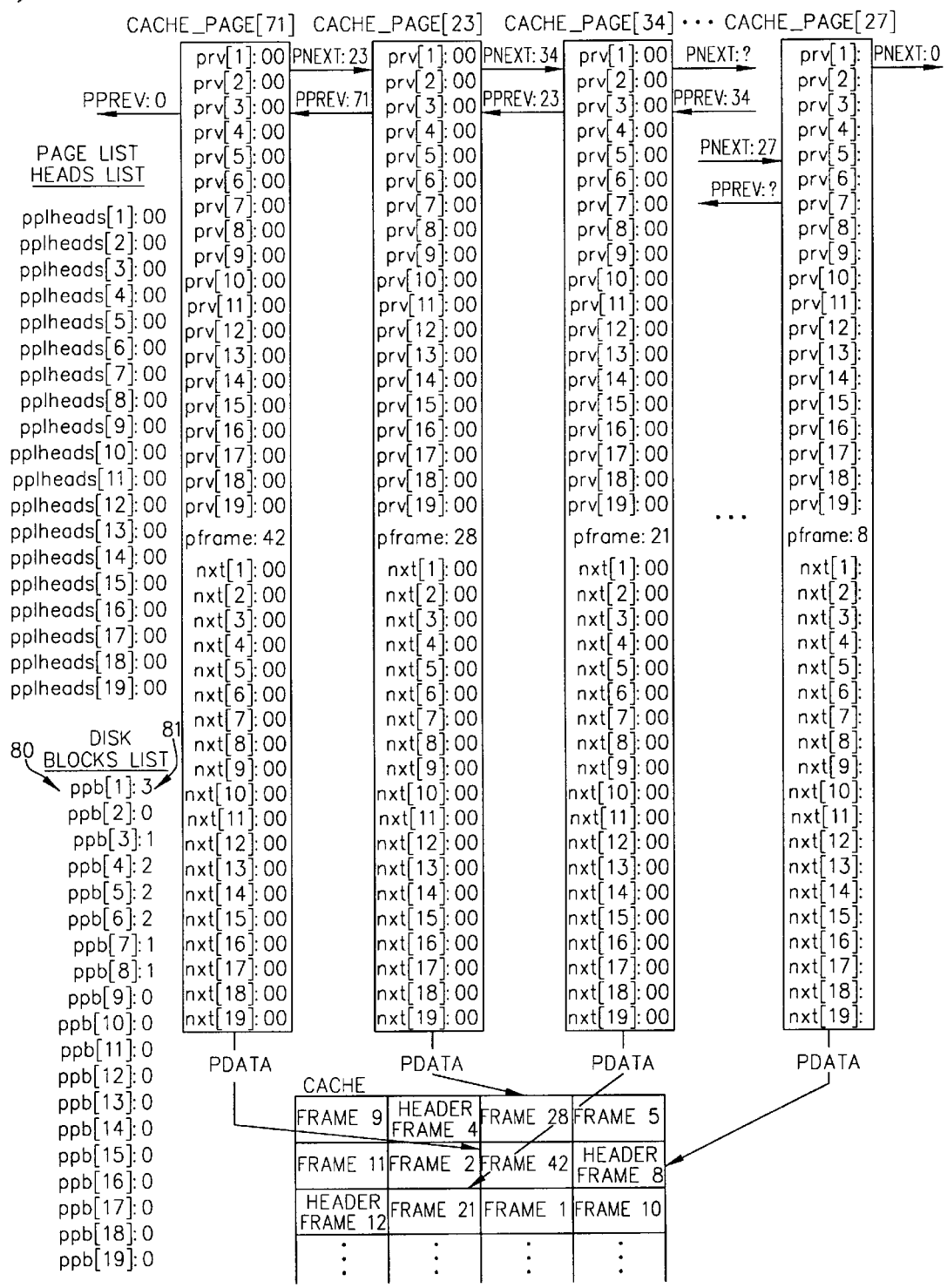

Assume that the application program requests a memory block of 2,000 bytes. Referring to Table 1, the smallest block size satisfying the memory request is block size 8 which contains 2,048 bytes or 128 16-byte paragraphs. The Memory Manager first attempts to satisfy the memory request by locating a memory block of block size 8 in a frame residing in the cache. Referring to FIG. 6, the eighth element (corresponding to block size 8) of the pplheads list (pplheads[8]) equals zero (00) which indicates that none of the frames in the cache have a free memory block of block size 8. The Memory Manager will continue scanning the pplheads list for each successive larger block size until the list is exhausted. In this example, there are no free memory blocks of block size 8 or larger located in any frame residing in the cache.

Next, the Memory Manager attempts to satisfy the memory request by locating a memory block of block size 8 in a partially allocated frame residing on the disk subsystem by scanning the pdb list. Referring again to FIG. 6, the eighth element (corresponding to block size 8) of the pdb list (pdb[8]) equals 1 which is a count entry indicating that there is exactly one partially allocated frame residing on the disk subsystem that contains a free memory block of block size 8.

Finally, Memory Manager examines the poolheads list (stored in MEMCONFIG as shown in FIG. 2) for the current memory subpool to find the head of the doubly linked frame header list. Once the list head is obtained, the Memory Manager examines the availability map (availmap) for each frame header in the doubly linked frame header list until the frame containing the free memory block of size 8 is found. Referring to FIG. 3, neither of the availability bitmaps of the frame headers for frames 3 and 6 (0x000007D0 and 0x00000390, respectively) have an availability bit (shown in Table 1) for a block size 8 (0x00000800) set. Therefore, neither frames 3 or 6 have a free memory block of block size 8. The availability bitmap of the frame header for frame 7 (0x00000810), however, does have an availability bit for block size 8 set. The eighth element (corresponding to block size 8) of the block offset array (boffs[8]) contains the offset (0x00000800) of the free memory block 31 of block size 8. The memory request is satisfied by returning the frame number (7), page number (00) and offset (0x00000800) to the requesting application program.

EXAMPLE 3

Assume that the application program requests a memory block of 8,000 bytes. Referring to Table 1, the smallest block size satisfying the memory request is block size 10 which contains 8,192 bytes or 512 16-byte paragraphs. The Memory Manager first attempts to satisfy the memory request by locating a memory block of block size 10 in a frame residing in the cache. Referring to FIG. 6, the tenth element (corresponding to block size 10) of the pplheads list (pplheads[10]) equals zero (00) which indicates that none of the frames in the cache have a free memory block of block size 10. The Memory Manager will continue scanning the pplheads list for each successive larger block size until the list is exhausted. In this example, there are no free memory blocks of block size 10 or larger located in a frame residing in the cache.

Next, the Memory Manager attempts to satisfy the memory request by locating a memory block of block size 10 in a partially allocated frame residing on the disk subsystem by scanning the pdb list. Referring again to FIG. 6, the tenth element (corresponding to block size 10) of the pdb list (pdb[10]) equals zero (0) which is a count entry indicating that there are no partially allocated frames residing on the disk subsystem that contain a free memory block of block size 10. The Memory Manager will continue scanning the pdb list for each successive larger block size until the list is exhausted. In this example, there are no free memory blocks of block size 10 or larger located in a partially allocated frame on the disk subsystem. Thus, since no memory block of sufficient size is found, a new frame is created to satisfy the memory request.

VI. Memory Manager Program Structure

The program structure of the Memory Manager in accordance with the present invention is shown diagrammatically in the flow diagrams of FIGS. 14–25. By C language convention, preprocessor macros or constants appear in all capital letters and program variables appear in all lower case letters. A summary of the macro definitions is presented for ease of understanding in Table 3 wherein is indicated the macro name, its value and a brief description. Similarly, a summary of the flow diagrams of FIGS. 14–26 is presented for ease of understanding in Tables 4A–D wherein is indicated the flow diagram name, a brief description of the procedure, and its inputs, variables and outputs. Each of the procedures will now be described with reference to Tables 3 and 4.

Figure 14:
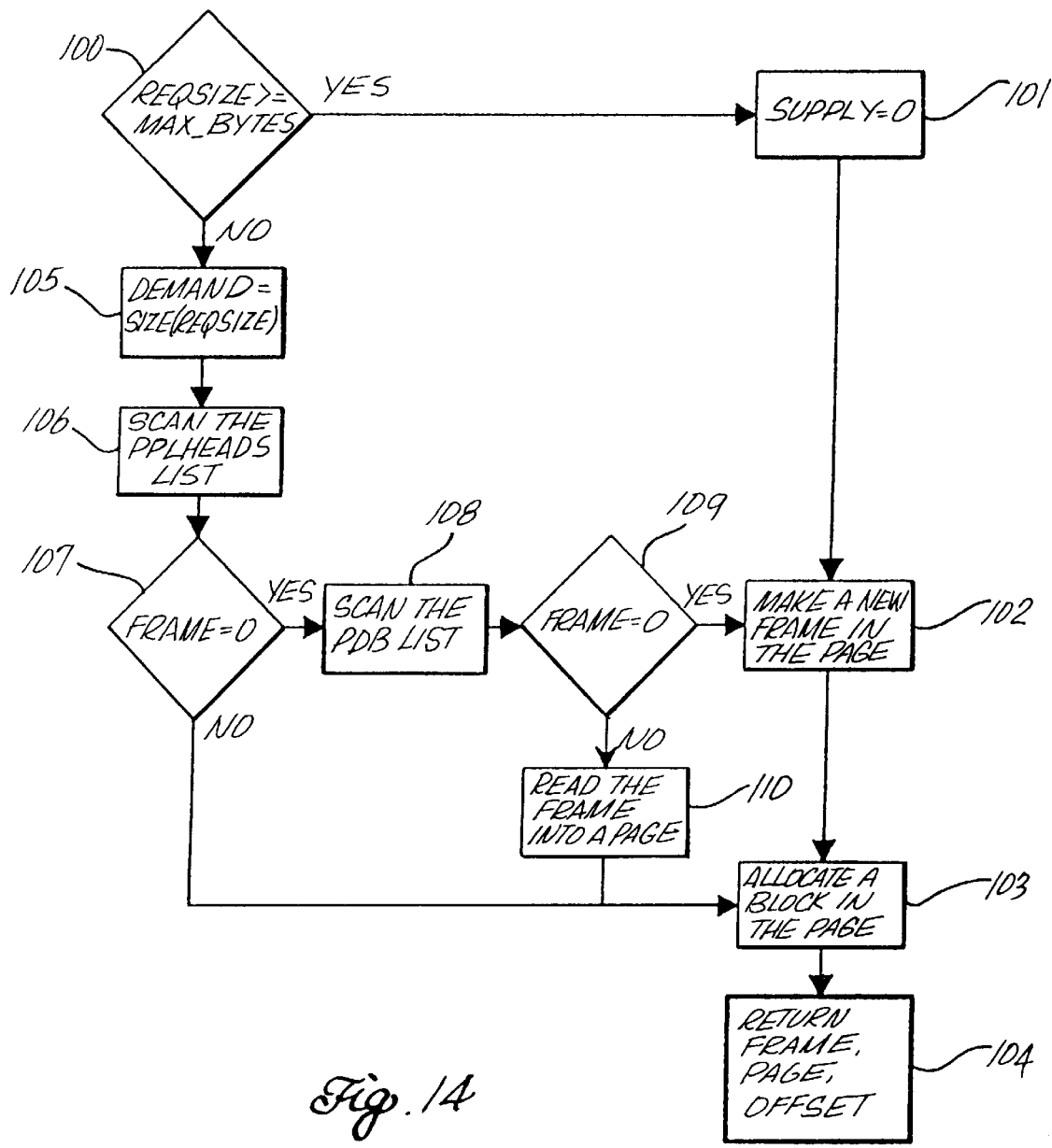
FIG. 14 is a flow diagram of a procedure to get a memory block in accordance with the present invention.

The procedure for finding and allocating a memory block 45 responsive to a memory request 65 is shown in FIG. 14. Its purpose is to get the required number of memory blocks 45 needed to satisfy a memory request 65 (FIG. 2) for a variable number of bytes. If the requested number of bytes to allocate, reqsize, is greater than or equal to the maximum number of bytes, MAX_BYTES (Table 3), in a frame 40 (block 100), the block size, supply, of the memory block 45 allocated is set to zero (block 101). A zero indicates that a new frame 40 must be obtained (block 102) to satisfy the memory request 65. Otherwise, if the requested number of bytes to allocate is less than the maximum number of bytes in a frame, a block size (reqsize) is saved in demand (block 105) for the smallest block size needed to satisfy the request. The pplheads list 54 is scanned (block 106), as further described hereinbelow in FIG. 15. If the pplheads list scan fails to find a free memory block 45 at least as large as demand, a frame number 49 equaling zero is set in frame (block 107) which indicates that the pdb list 70 must be scanned (block 108), as further described hereinbelow in FIG. 24. If the pdb list 70 scan fails to find a free memory block 45 at least as large as demand, the frame number 49 remains zero (block 109) and indicates that a new frame 40 must be obtained (block 102). If the pdb list scan succeeds, the frame that was located in the pdb list scan (in block 108) must be obtained or read from the disk subsystem 4 (block 110). Once a new frame is located or an existing frame is obtained, a memory block 45 is allocated from the page 46 containing that frame 40 (block 103), as further described hereinbelow in FIG. 16. The procedure returns the frame number 49, page number 47 and the offset 67 of the memory block 45 within the frame 45 (block 104).

Figure 15:
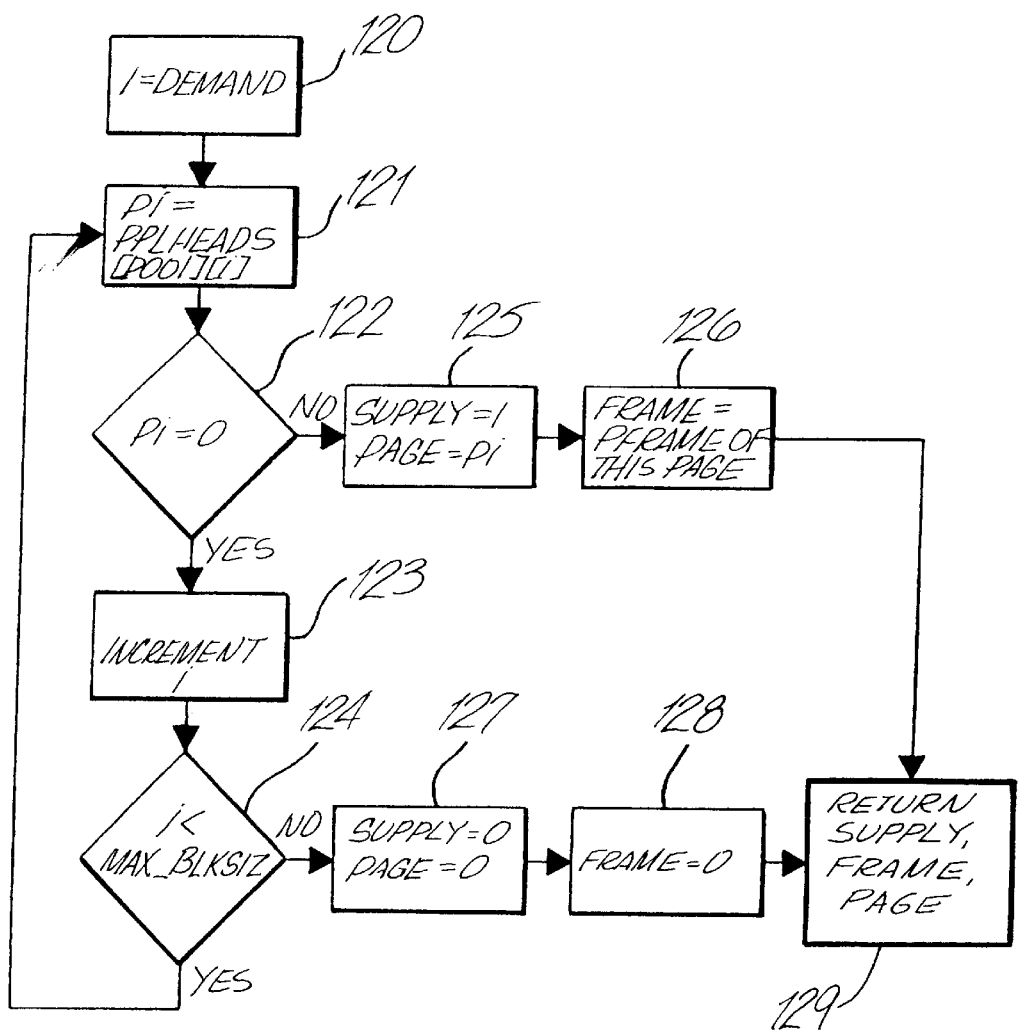
FIG. 15 is a flow diagram of a procedure to scan the pooled page list heads list.

A procedure for scanning the pplheads list 54 (block 106) based on the above factors is shown in FIG. 15. Its purpose is to scan the pplheads list 54 for a memory block 45 of a desired block size. The minimum block size to allocate is selected by storing demand in i (block 120). Each pplheads list page entry 71 is looked up by block size (block 121). To this end, the index number for each ppl heads list entry 71 is stored in pi. Each page entry 71 is examined to determine whether it is zero or stores the number of a page 47 in the cache 15 containing a frame having the desired memory block size (block 122). If it does not, that is, when the page entry 71 equals zero, the block size is incremented by 1 (block 123) and the process is repeated until the maximum block size MAX_BLKSIZ (Table 3) is exceeded (block 124). If a page entry 71 indicating that a suitable memory block 45 exists is found in block 122, the block size i of the selected memory block 45 and page entry 71 pi (block 125) and the frame number pframe 49 are stored in frame in supply and page, respectively (block 126). Otherwise, if in block 124 the maximum block size is exceeded, the block size supply and page number 47 (block 127) and frame number 49 (block 120) are set to zero. The block size supply, frame number 49 and page number 47 are returned to the calling routine (block 129).

Figure 16:
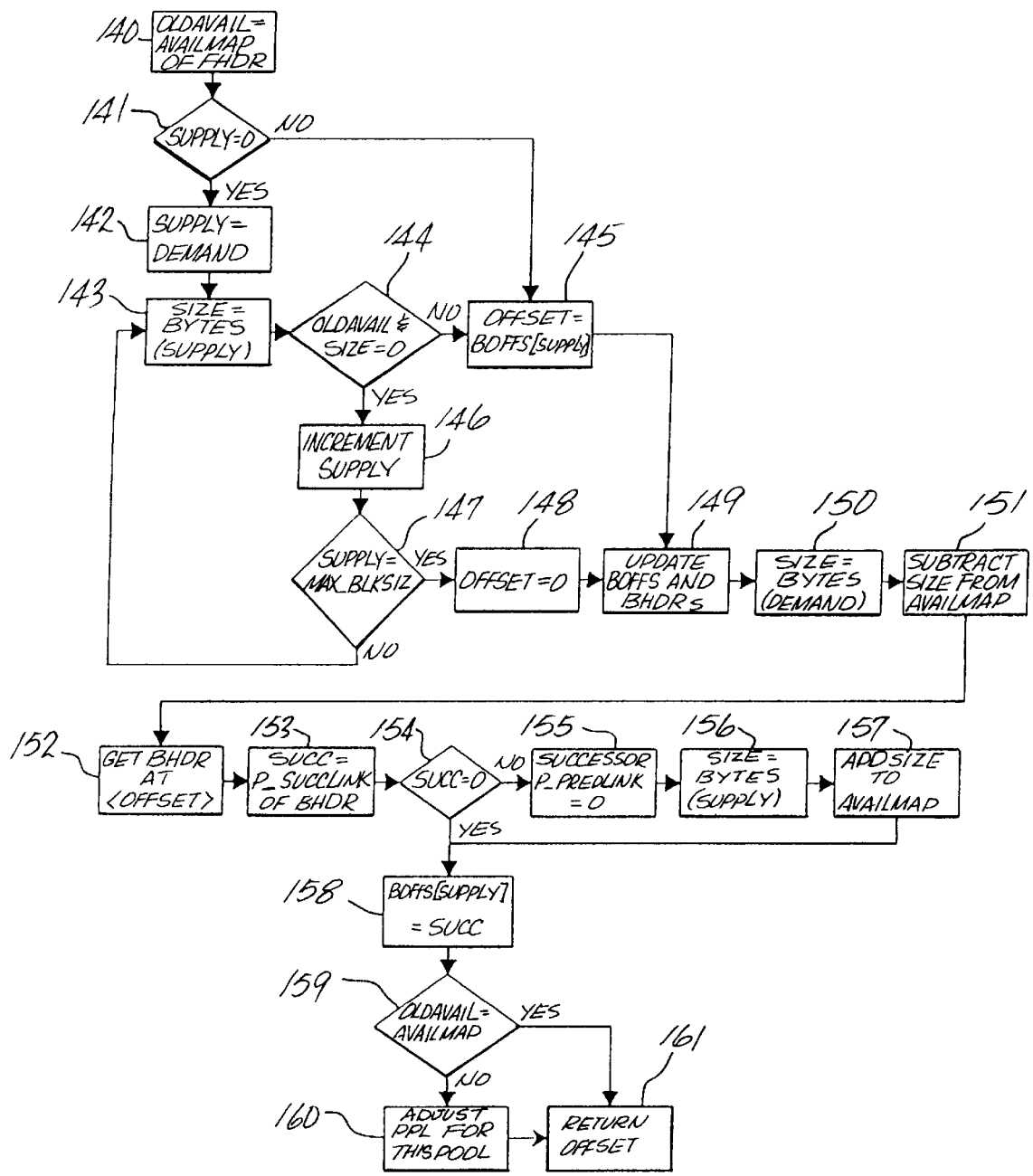
FIG. 16 is a flow diagram of a procedure to allocate a memory block.

A flow diagram of a procedure for allocating a memory block 45 (block 103) based on the above factors is shown in FIG. 16. Its purpose is to allocate a memory block 45 of a selected block size on the specified page 46 in the cache 15. The availmap of the frame header (FIG. 10) previously selected, FHDR, is stored in program variable oldavail (block 140). If the block size, supply, is zero (block 141) which indicates that a suitable memory block 45 could not be located, the block size, supply, is set to the block size in stored in the input parameter demand (block 142) and size is set to the actual number of bytes, BYTES (supply) for the block size, supply, of the original request (block 143). The availability bitmap 60 of the selected frame, oldavail, and the desired number of bytes to allocate, size, are logically ANDed (block 144) and if that result is zero, the block size, supply, is incremented (block 146). The procedure (blocks 143, 144, 146) is repeated until either the maximum block size, MAX_BLKSIZ (Table 3), is exceeded (block 147) or a suitable memory block 45 is found (block 144). Once a memory block 45 at least as large as the desired size is located within some frame (block 144), the block offset 67 of the memory block, boffs[supply], is stored in program variable offset (block 145) and the block offset array 62, boffs[ ], and block header (FIG. 11), BHDR, are updated (block 149), as further described hereinbelow in FIG. 17. If the maximum block size, MAX_BLKSIZ (Table 3), has been reached (block 147), the offset 67 of the memory block 45, offset, is set to zero (block 148) since the memory block size will equal the entire frame. The number of bytes allocated (requested block size demanded), BYTES (demand), is stored in program variable size (block 150) and is subtracted from the availability bitmap 60, availmap, (block 151).

The procedure next performs several housekeeping tasks. The block header (FIG. 11), BHDR, is examined at the offset 67 of the selected memory block 45, offset, (block 152) and the pointer to the successor memory block 45, p_succlink, of the block header (FIG. 11), BHDR, is stored in program variable succ (block 153). If the pointer to the successor memory block 45, succ, is non-zero indicating that another block in the frame has a free memory block 45 of the same selected size (block 154), the pointer to the predecessor memory block 45, p_predlink, of the successor memory block 45 is set to zero (block 155), that is, the memory block header (FIG. 11) for the block in the frame is set so that it no longer points back to the current block. The number of bytes allocated, size, is determined from the size of the memory block 45 which was allocated (BYTES(supply)) (block 156) and is added to the availability bitmap 60, availmap, (block 157) of the frame. Regardless of whether there is an offset 67 to a successor memory block 45, the block offset array entry, boffs[supply], is updated to point to the successor free memory block 45, succ, of the selected block size (block 158). Finally, the current availability bitmap 60, availmap, for the selected frame is compared to the original availability bitmap 60, oldavail, (block 159) and the ppl for the selected memory subpool, pool, are adjusted (block 160), as further described hereinbelow in FIG. 18. After the ppl are adjusted, or if the availability bitmaps 60 do not match (block 159), the offset 67 of the selected memory block 45, offset, is returned to the calling procedure (block 161).

Figure 17:
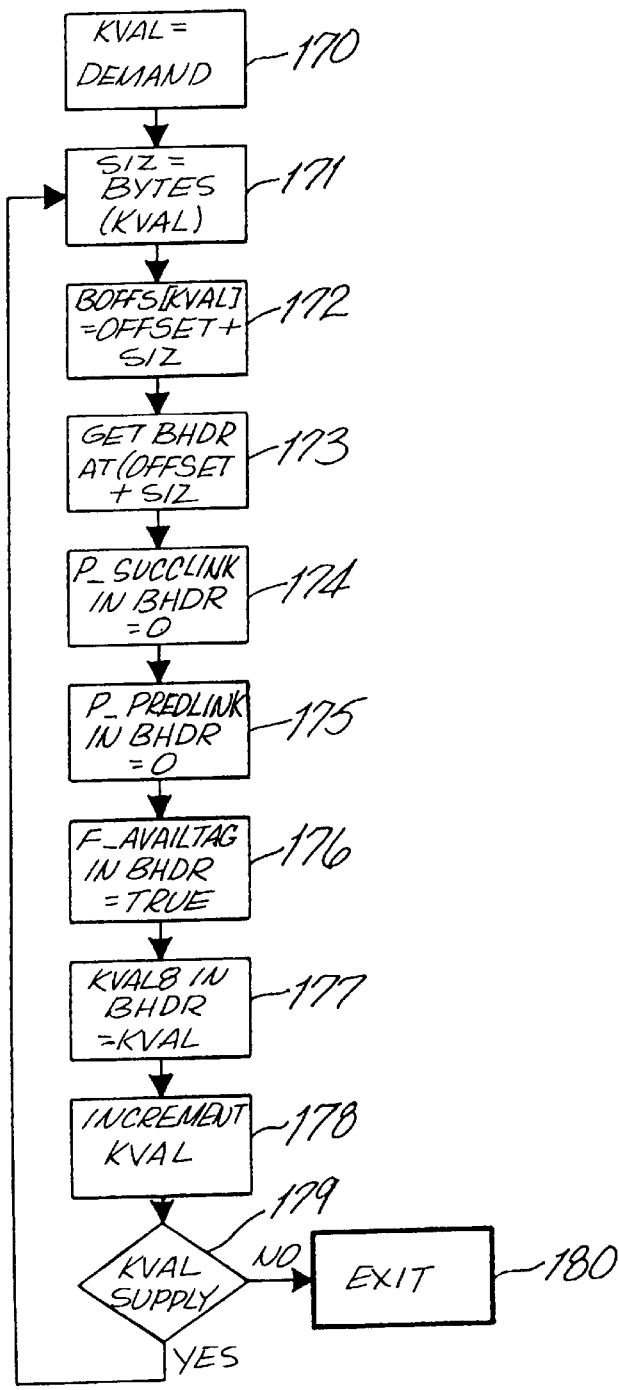
FIG. 17 is a flow diagram of a procedure to update the block offset list and block headers.

A procedure for updating a block offset array 62 and block header (FIG. 11) (block 149) based on the above factors is shown in FIG. 17. Its purpose is to update a block offset array 62 and block header (FIG. 11). A minimum block size to allocate, demand, is stored in program variable kval (block 170). The number of bytes in the current block size being updated, BYTES(kval), is stored in program variable size (block 171). The entry in the block offset array 62 corresponding to the selected block size, boffs[kval], is set to the sum of the offset 67 to the memory block 45 allocated, offset, plus the number of bytes in the current block size being updated, size (block 172). The block header (FIG. 11), BHDR, at the offset 67 for the size selected, that is, located at offset+size, is obtained (block 173) and the pointers to the successor, p_succlink, (block 174) and predecessor, p_predlink, (block 175) memory blocks 45 for the selected memory block header (FIG. 11), BHDR, are set to zero. The availability tag, f_availtag, for the selected memory block header (FIG. 11), BHDR, is set to indicate that it is free ("TRUE") (block 176) and the power of 2 block size indicator, kval8, for the selected memory block header (FIG. 11), BHDR, is set to the selected block size, kval (block 177). The selected block size, kval, is incremented to set it to the next larger block size (block 178) and the procedure (blocks 171–78) is repeated until the selected block size, kval, exceeds the allocated block size, supply (block 179), whereupon the procedure terminates (block 180).

Figure 18:
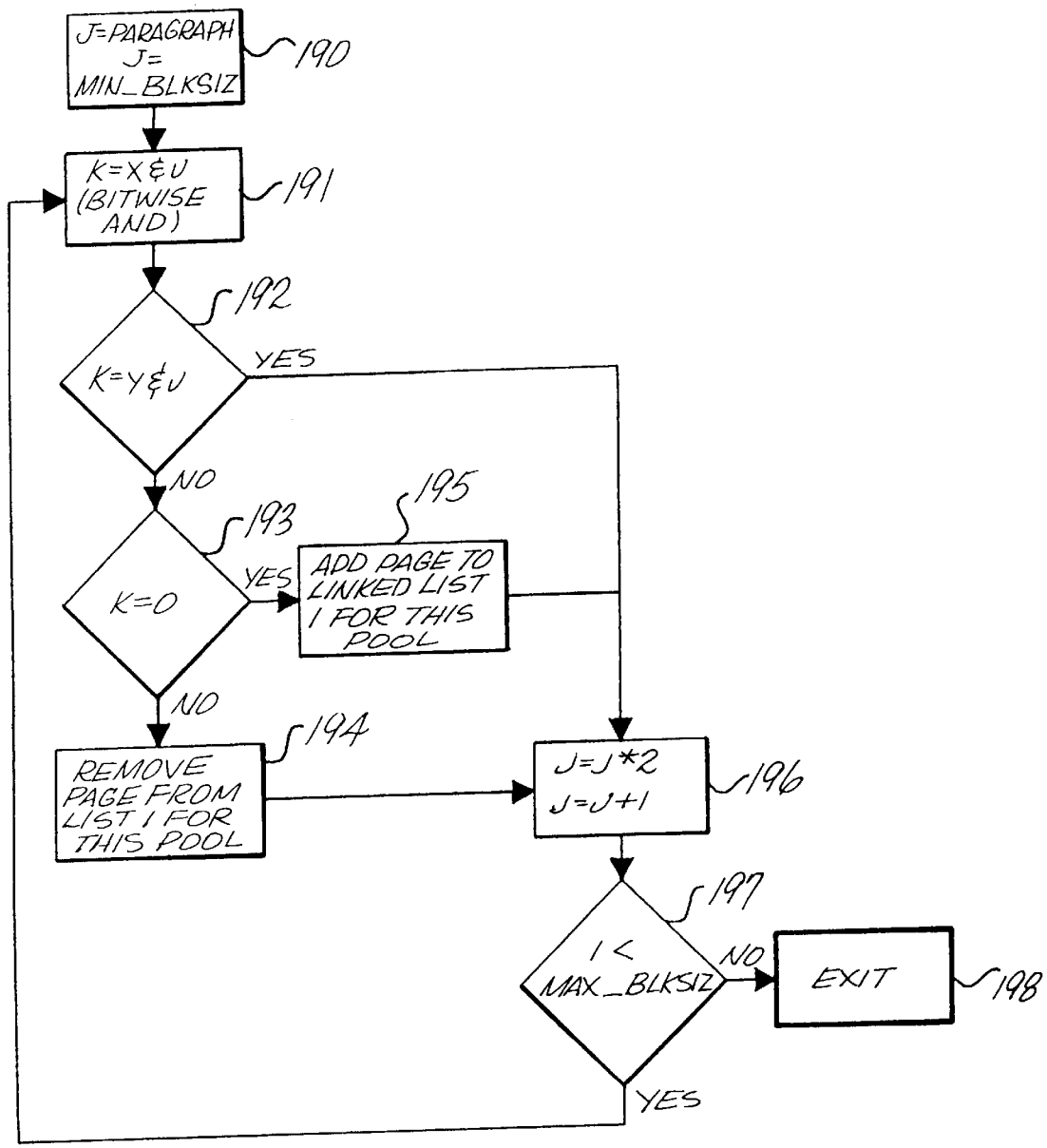
FIG. 18 is a flow diagram of a procedure to adjust pooled page list heads lists.

A procedure for adjusting the ppls (block 160), including each ppl of the supplied cache control array elements, based on the above allocation or deallocation factors is shown in FIG. 18. Its purpose is to modify the aforementioned ppl during a frame I/O event, such as a readframe( ) or swapframe( ) procedure call, or after an alloc_blocko or free_block ( ) procedure call. The number of bytes in a minimum memory block 45, Paragraph, and the minimum block size, MIN_BLKSIZ (Table 3), are stored in program variables j and i, respectively (block 190). In the described embodiment, the number of bytes in a minimum memory block 45 equals a paragraph comprising 16 bytes and the minimum block size equals one. The availmap before the allocation or deallocation operation (as previously stored in input parameter x) is logically ANDed with the stored minimum number of bytes, j, and the result stored in program variable k (block 191). That result, k, is compared to the availmap after the allocation or deallocation operation (as previously stored in input parameter y) logically ANDed with the minimum number of block size bytes, j (block 192). If the result indicates a mismatch, the program variable k is examined (block 193) and if it is non-zero, the page is removed from the linked list, i, for the memory pool, pool (block 194), as further described hereinbelow in FIG. 20. Otherwise, if the program variable k is zero (block 193), the page is added to the linked list, i, for the memory pool, pool (block 195). The next block size is determined by number of bytes, j, and block size, i, (block 196) and the procedure (blocks 191–96) is repeated until the maximum block size, MAX_BLKSIZ (Table 3), has been exceeded (block 197), whereupon the procedure terminates (block 198).

Figure 19:
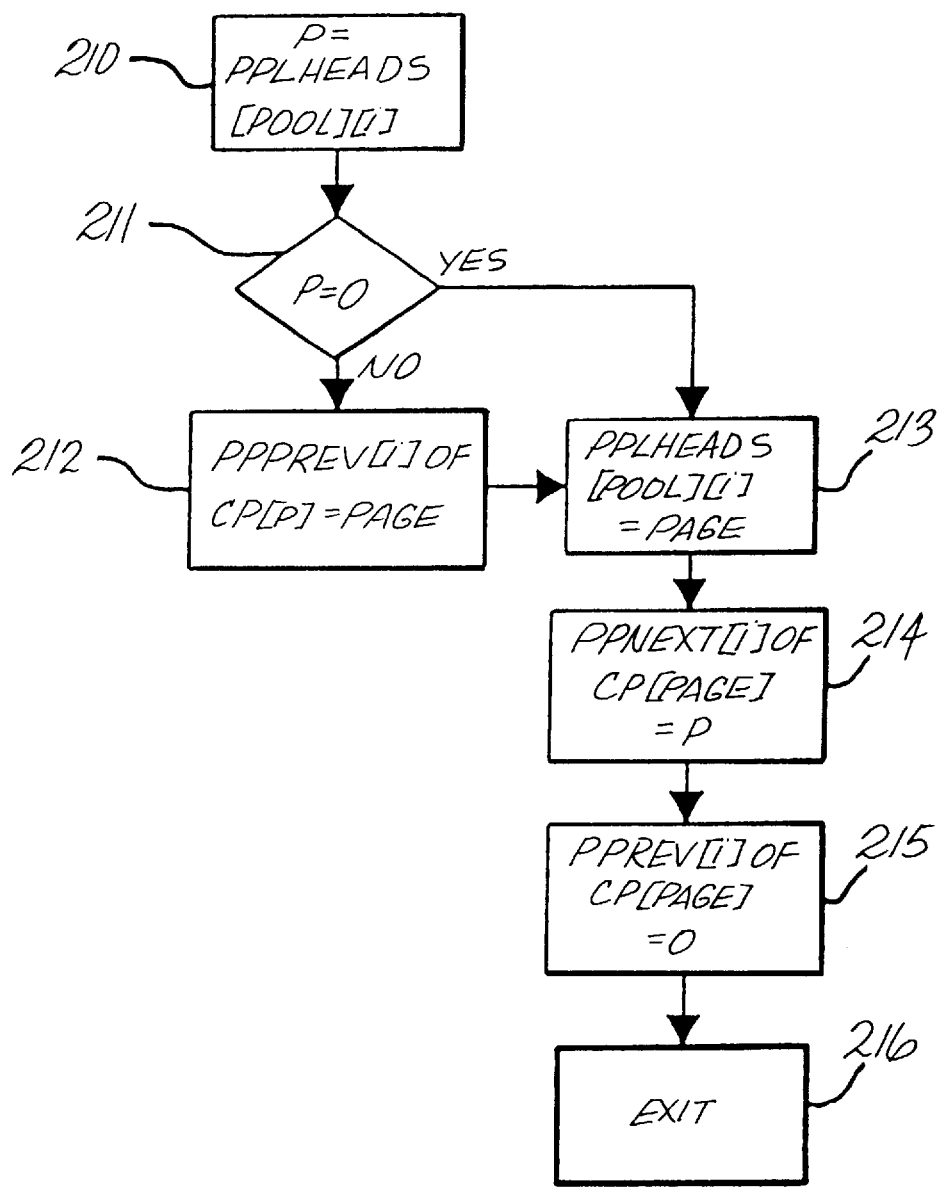
FIG. 19 is a flow diagram of a procedure to add a page to the pooled page list heads list.

A procedure for adding a page to the pplheads list 54 (block 195) based on the above factors is shown in FIG. 19. Its purpose is to add an entry 71 to the pplheads list 54 during the procedure to adjust the ppls (shown in FIG. 18). An entry 71 in the pplheads list 54, pplheads[pool] [i], from the selected memory subpool, pool, corresponding to the selected block size, i, being adjusted is stored in program variable p (block 210) and examined to determine whether a free memory block 45 for the selected size exists, that is, whether the entry 71, p, is zero (block 211). If it does not, the pointer to the previous page, ppprev[i], in the selected page, CP[p], is set to the current page, page (block 212). Regardless, the pplheads list entry 71 being adjusted, pplheads[pool] [i], is set to the selected page, page (block 213). The pointers to the next, ppnext[i], (block 214) and previous, ppprev[i], (block 215) pages for the selected page, CP[page], are set to the page, p, that the entry being adjusted previously pointed to (block 214) and zero (block 215), respectively, whereupon the routine exits (block 216).

Figure 20:
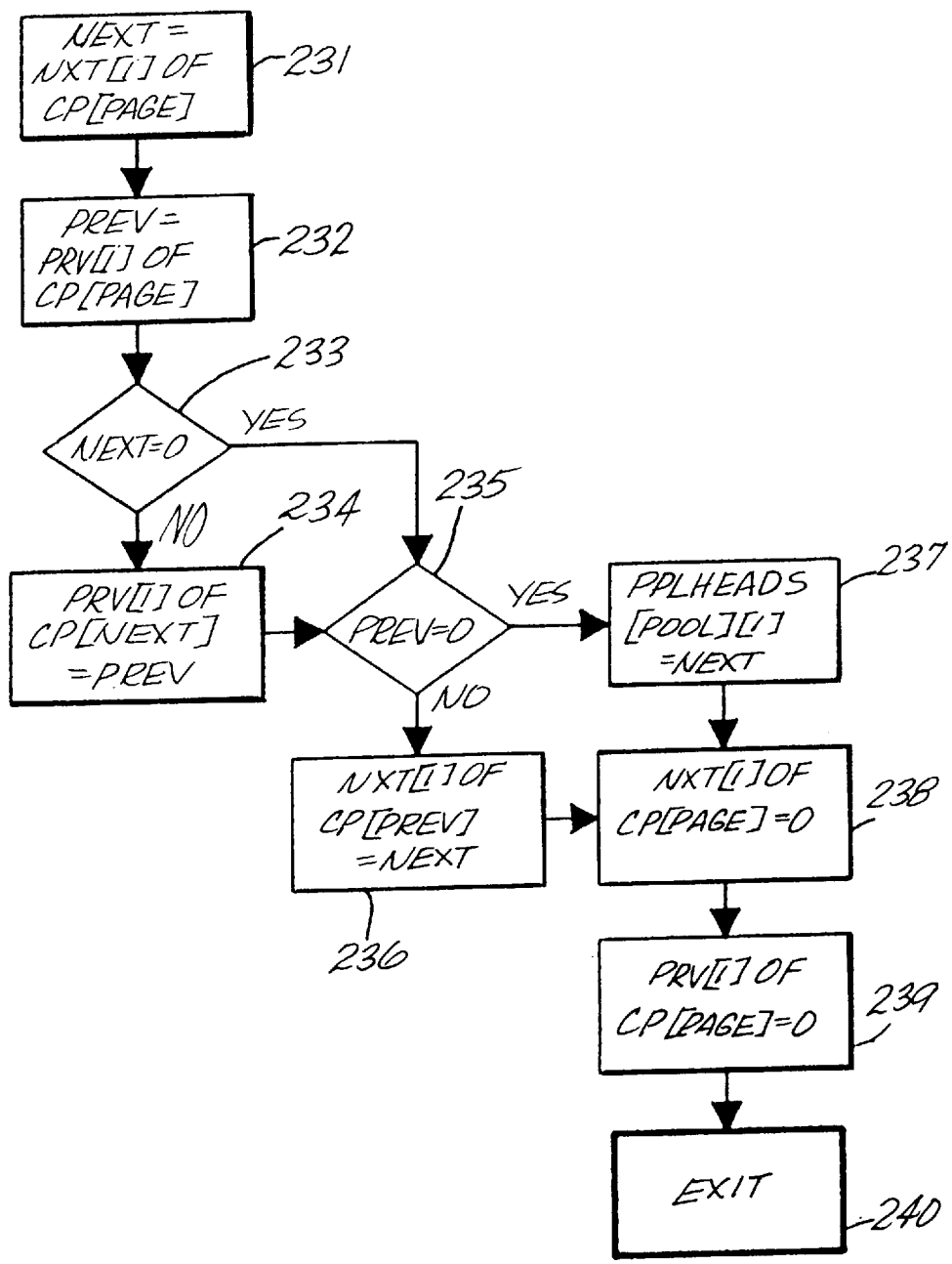
FIG. 20 is a flow diagram of a procedure to remove a page from a pooled page list.

A procedure for removing a page from the pplhead list (when necessary) (block 194), including from each ppl of the supplied cache control array elements, based on the above factors is shown in FIG. 20. Its purpose is to remove a ppl entry during the procedure to adjust the ppls (as shown in FIG. 18). The next, nxt[i], (block 231) and previous, prv[i], (block 232) pages in the selected cache page, CP[page], are stored in program variables next and prev, respectively. If there is a next page, that is, the next page, next, is non-zero (block 233), the offset 67 to the previous page, prv[i], pointed to by the next page, CP[next], is set to the offset 67 to the previous page, prev, for the selected page (block 234). Similarly, if there is a previous page, that is, the previous page, prev, is non-zero (block 235), the offset 67 to the next page, nxt[i], pointed to by the previous page, CP[prev], is set to the offset 67 to the next page, next, for the selected page (block 236). Otherwise, if there is no previous page, that is, the previous page, prev, is zero (block 235), the pplheads list entry 71, pplheads [pool] [i], from the selected memory subpool, pool, corresponding to the selected block size, i, is set to the stored next page, next (block 237). Finally, the offsets to the next, nxt[i], (block 238) and previous, prv[i], (block 239) pages for the selected page, CP[page], are set to zero, respectively, whereupon the procedure terminates (block 240).

Figure 21:
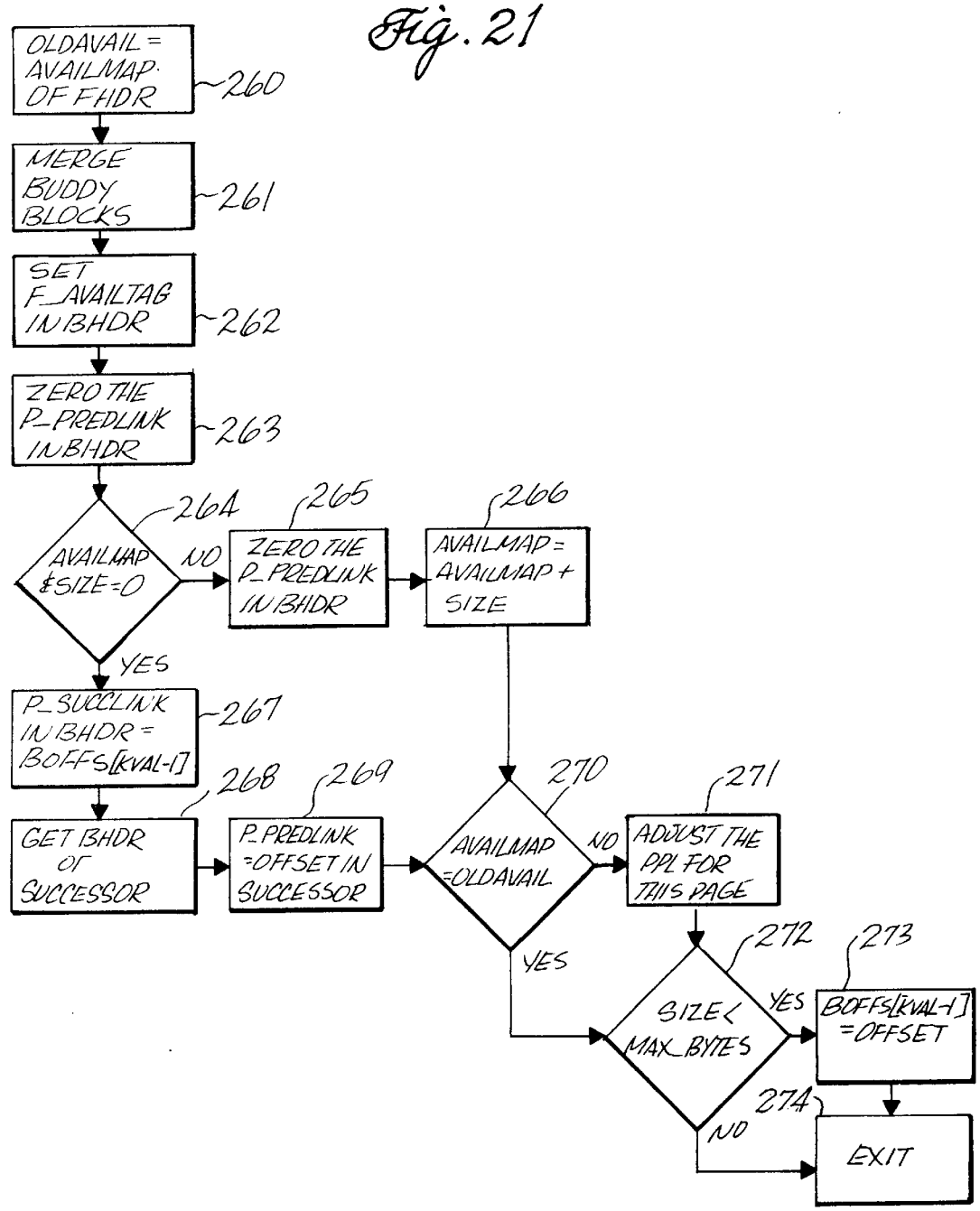
FIG. 21 is a flow diagram of a procedure to free a memory block.

A procedure for freeing a memory block 45 is shown in FIG. 21. Its purpose is to free a memory block 45 at an offset 67 in a frame on a specified page responsive to a memory deallocation request from an application program. It is the functional opposite of the procedure to allocate a memory block 45 (shown in FIG. 16). The availability bitmap 60, availmap, for the frame, FHDR, containing the memory block 45 to be freed is stored in program variable oldavail (block 260) and appropriate "buddy" blocks are merged with adjacent blocks (block 261), as further described hereinbelow in FIG. 22. The availability tag for the memory block 45, f_availtag, from the block header (FIG. 11), BHDR, is set to indicate that the memory block 45 is now free (block 262) and the offset 67 to the previous memory block 45, p_predlink, from the block header (FIG. 11), BHDR, is set to zero (block 263). The availability bitmap 60, availmap, for the frame is logically ANDed with the largest size, size, of the memory block 45 freed (returned from the merge buddy blocks procedure described hereinbelow in FIG. 22) to determine whether any other memory blocks 45 of the selected size are free in the frame (block 264). If so, the pointer to the successor memory block 45, p_succlink, from the block header (FIG. 11), BHDR, is set to the block offset 67 for the next memory block 45 of the same block size, boffs[kval-1] (block 267). In addition, the memory block header (FIG. 11), BHDR, for the successor memory block 45, successor, is obtained (block 268) and the offset 67 to the predecessor memory block 45, p_predlink, of the selected size is set to the offset, offset, stored in the obtained successor memory block 45, successor (block 269). If there is no memory block 45 of the same block size (block 264), the offset 67 to the predecessor memory block 45, p_predlink, in the block header (FIG. 11), BHDR, of the selected size is set to zero (block 265) and the availability bitmap 60, availmap, is updated by setting it to the sum of the existing availability bitmap 60, availmap, plus the number of bytes of the memory block 45 being freed or deallocated, size, to indicate that a memory block 45 of the selected size is now free (block 266).

Next, the old availability bitmap 60, oldavail, (previous to the freeing of the memory block 45) is compared to the current availability bitmap 60, availmap (after the freeing of the memory block 45) (block 270). If the two availability bitmaps 60 do not match, the ppls for the selected page, including each of the ppls of the supplied cache control array elements, are adjusted (block 271), as further described hereinabove in the procedure to adjust the ppls (shown in FIG. 18). If the number of bytes freed, size, is fewer than the maximum number of bytes in a memory block 45, MAX_BYTES (Table 3), the entry 71 for the next memory block 45 of the same block size in the block offset array 62, boffs[kval-1], is set to the current block offset, offset, (block 273), whereupon the procedure terminates (block 274).

Figure 22:
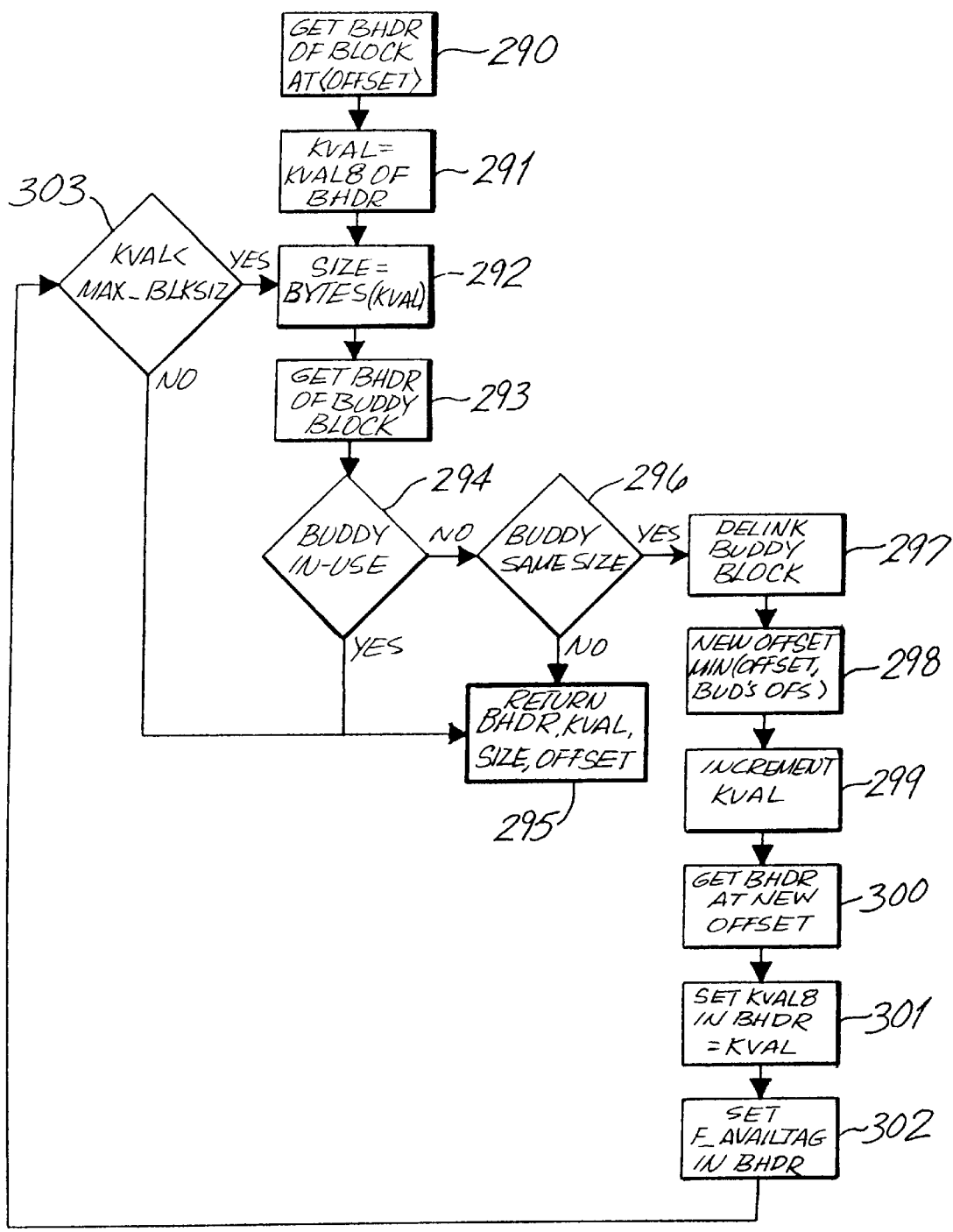
FIG. 22 is a flow diagram of a procedure to merge buddy blocks.

A procedure for merging buddy blocks (block 261) based on the above factors is shown in FIG. 22. Its purpose is to incrementally merge power of 2 buddy blocks whenever a memory block 45 is freed according to the procedure to free a memory block 45 (shown in FIG. 21). A memory block header (FIG. 11), BHDR, located at the selected offset 67 for the memory block 45 being freed, offset, is obtained (block 290) and the block size of the original memory block 45 to free, BHDR.kval8, is stored in program variable kval (block 291). The number of bytes, size, corresponding to the stored block size, BYTES(kval), is determined (block 292) and the block header (FIG. 11) for the buddy memory block 45, BHDR, is obtained (block 293).

If the buddy block is not in use, that is, is also free (block 294) and the buddy block is of the same size as the memory block 45 being freed (block 296), the memory block 45 being freed and the corresponding buddy block are merged according to the following set of steps. First, the buddy block is unlinked from its predecessor and successor buddy blocks (block 297), as further described hereinbelow in FIG. 23. A new offset 67 is determined by collecting the minimum (MIN( )) of the offset 67 for the memory block 45 being freed, offset, and the offset 67 for the buddy block, buddy block offset (block 298). The block size, kval, is incremented (block 299) to the next larger block size. The memory block header (FIG. 11), BHDR, located at the new offset, offset, is obtained (block 300) and the block size stored in the obtained block header (FIG. 11), BHDR.kval8, is set to the incremented block size, kval (block 301). Finally, the availability tag, f_availtag, in the block header (FIG. 11), BHDR, is set to indicate that the memory block 45 is free (block 302). The procedure (blocks 292–302) is repeated until the maximum block size, MAX_BLKSIZ (Table 3), is exceeded (block 303) or the buddy block is not mergeable because it is in use (block 294) or is not of the same size (block 296), whereupon the procedure returns the block header (FIG. 11) (BHDR), block size (kval), number of bytes (size), and block offset 67 of the largest merged block (offset) (block 295).

Figure 23:
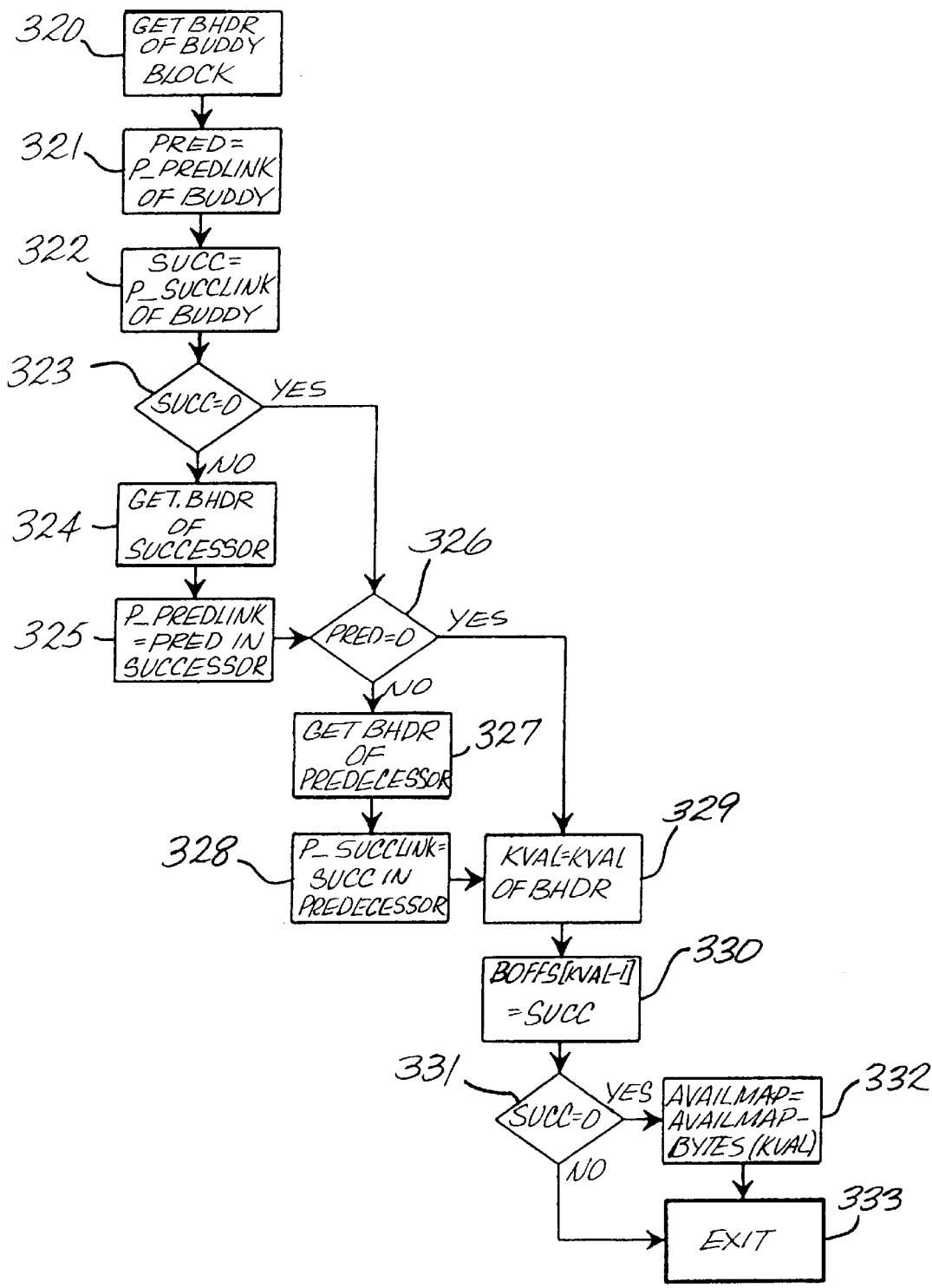
FIG. 23 is a flow diagram of a procedure to unlink a memory block.

A procedure for unlinking a memory block 45 (block 297) based on the above factors is shown in FIG. 23. Its purpose is to unlink a memory block header (FIG. 11) from its links to other memory blocks 45 occurring in the selected frame during the procedure to merge buddy blocks (shown in FIG. 22). The header of the buddy block, BHDR, is obtained (block 320) and the offset 67 to its predecessor, p_predlink, (block 321) and successor, p_succlink, (block 322) buddy blocks are stored in local program variables pred and succ, respectively. If the buddy block offset to successor memory block 45, succ, is non-zero (block 323), the block header (FIG. 11) for the successor memory block 45, BHDR, is obtained (block 324) and the predecessor offset of the selected buddy block, p_predlink, is set to the offset of the predecessor of the successor memory block 45, pred (block 325). Likewise, if the buddy block offset to the predecessor memory block 45, pred, is non-zero (block 326), the block header (FIG. 11) for the predecessor memory block 45, BHDR, is obtained (block 327) and the successor offset of the selected buddy block, p_succlink, is set to the offset 67 of the successor of the predecessor memory block 45, succ (block 328). Upon completion of the two previous series of steps for adjusting the predecessor (blocks 323–25) and successor (blocks 326–28) pointers, the block size of the buddy block, kval, is set to the block size stored in its block header (FIG. 11), BHDR.kval (block 329) and the entry for the corresponding block offset 67 for the next smaller block size, boffs[kval-1], is set to the offset 67 of the successor memory block 45, succ (block 330). If there is no successor memory block 45, succ, from the selected buddy block (block 331), the availability bitmap 60, availmap, is updated by taking the difference of the existing availability bitmap 60, availmap, less the number of bytes for the selected block size, BYTES(kval) (block 332), whereupon the procedure terminates (block 333).

Figure 24:
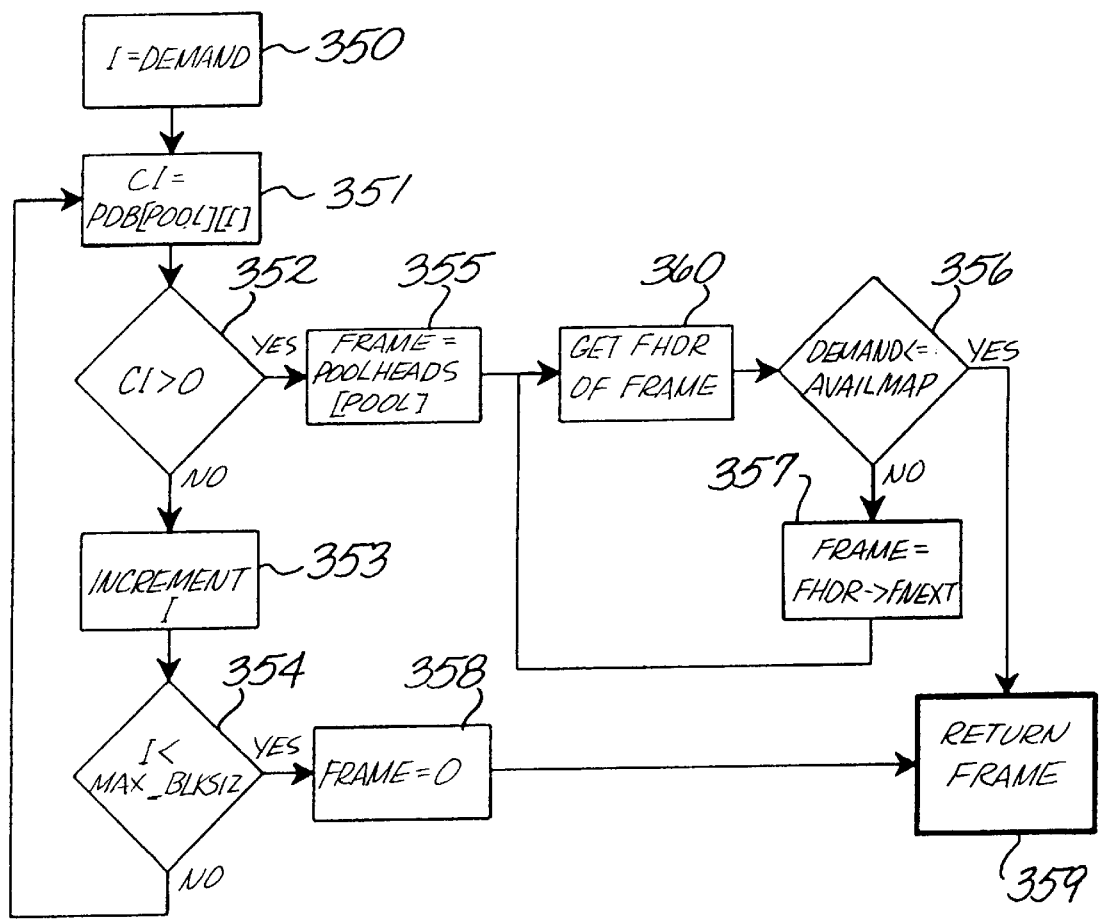
FIG. 24 is a flow diagram of a procedure to scan the pooled disk block list.

A procedure for scanning the pdb list 70 (block 108) based on the above factors is shown in FIG. 24. Its purpose is to scan the pdb list 70 for a memory block 45 of a selected block size during the procedure to get a memory block 45 (shown in FIG. 14). The block size of the memory block 45 to allocate, demand, is stored in a program variable i (block 350). The pdb list entry 80, pdb[pool] [i], from the selected memory subpool, pool, corresponding to the selected block size, i, is stored in another program variable ci as a count entry 80 (block 351). If the count entry 80, ci, is zero indicating that the count of memory blocks 45, pdb[pool] [i], from the selected memory subpool, pool, corresponding to the selected block size, i, is zero (block 352), the block size, i, is incremented to the next larger block size (block 353) and the steps of storing, comparing and incrementing (blocks 351–53) are repeated until the maximum block size, MAX_BLKSIZ (Table 3), is exceeded (block 354) or a non-zero count entry 80 (block 352) is found. If the maximum block size is exceeded (block 354), the frame number 49 is set to zero (block 358). If a non-zero count entry 80, ci, is found in the pdb list 70 (block 352), the frame for the first frame, poolheads[pool], from the memory subpool, pool, is stored in program variable frame (block 355) and its frame header (FIG. 10), fhdr, is obtained (block 360). The availability bitmap 60, availmap, for the frame is compared to the minimum size of memory block 45 to allocate, demand, to determine whether there is a free memory block 45 of the selected block size free in that frame (block 356). If not, the next frame, frame, in the memory subpool is selected using the pointer to the next frame, fhdr->fnext, (block 357) and the steps of obtaining and comparing (blocks 360 and 356) are repeated until a frame containing a free memory block 45 of the requested block size is found. The frame number 49, frame, is returned to the calling procedure (block 359).

Figure 25:
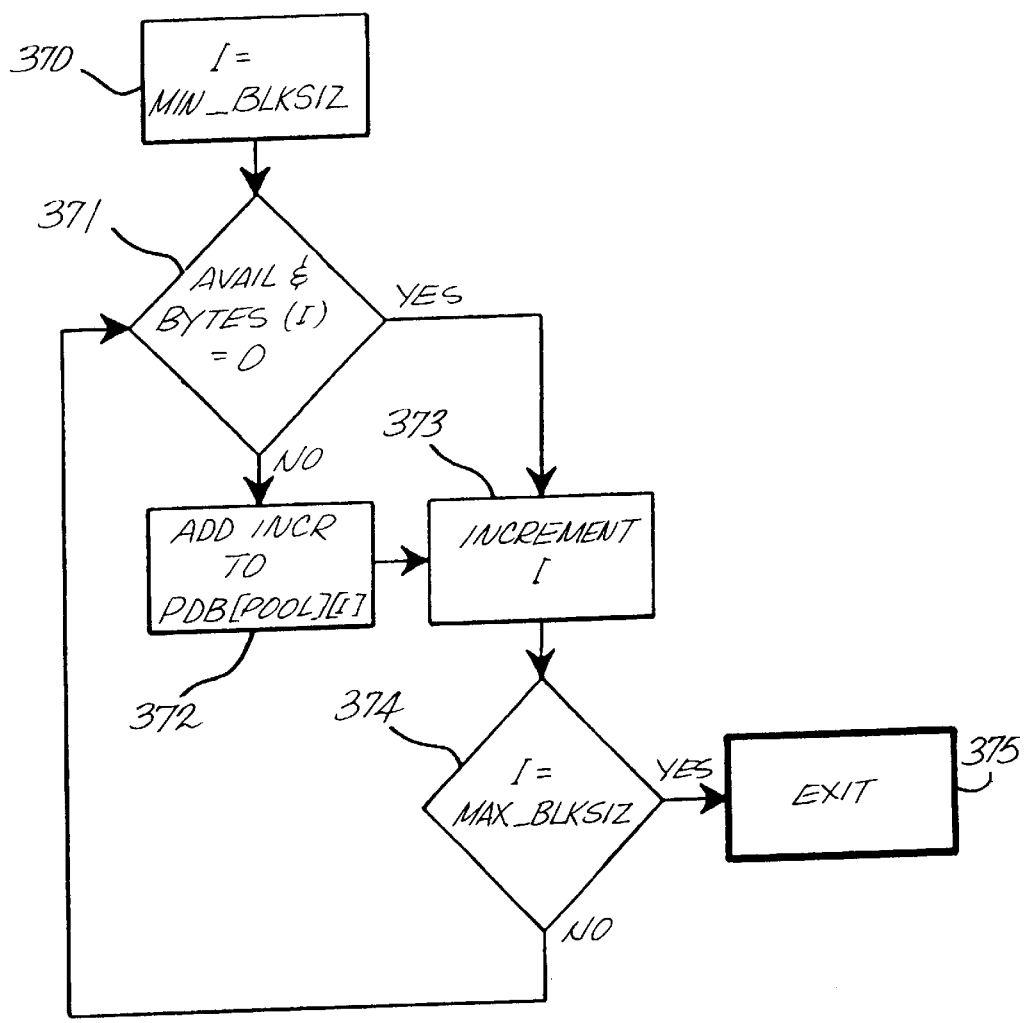
FIG. 25 is a flow diagram of a procedure to adjust the pooled disk block list.

A procedure for adjusting the pdb list 70 (block 103) based on the above factors is shown in FIG. 25. Its purpose is to modify the pdb list 70 during an I/O event, such as a readframe( ), swapframe( ) or rollback( ) operation, which occurs during the procedures to get a memory block 45 (shown in FIG. 14) or to free a memory block 45 when the cache does not contain sufficient space during a frame swap (shown in FIG. 21). The minimum block size, MIN_BLKSIZ (Table 3), is stored in a program variable i (block 370). The availability bitmap 60, availmap, in the frame header (FIG. 10) for the selected frame, avail, is logically ANDed with the number of bytes, BYTES(i), corresponding to the selected block size, i (block 371). If this comparison indicates that other memory blocks 45 of the selected block size exist, the pdb list entry 80, pdb[pool] [i], from the selected memory subpool, pool, corresponding to the selected block size, i, is incremented positively or negatively to adjust the free memory block count (block 372). The next larger block size is selected by incrementing the selected block size, i, (block 373) and the comparison and incrementing steps (blocks 371–73) are repeated until the maximum block size, MAX_BLKSIZ (Table 3), is exceeded (block 374), whereupon the procedure terminates (block 375).

Figure 26:
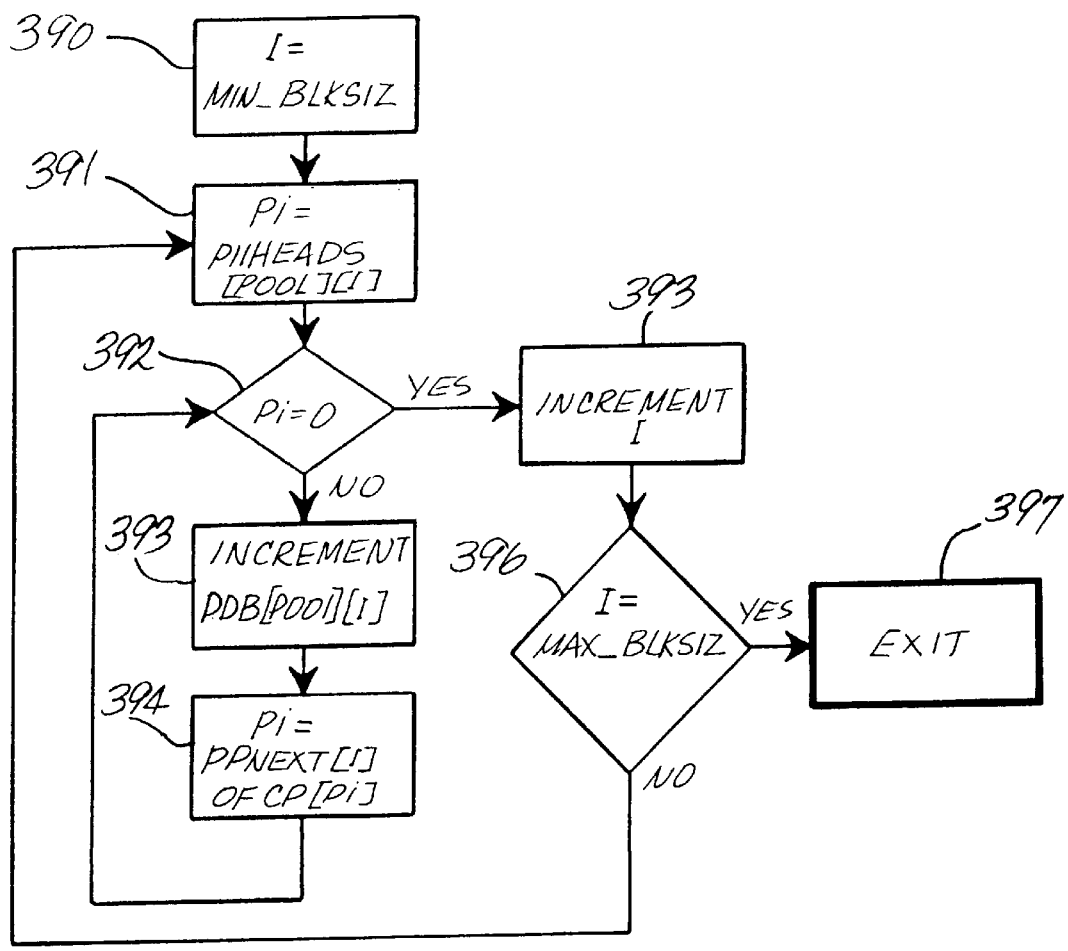
FIG. 26 is a flow diagram of a procedure to update the pooled disk block list.

A procedure for updating the pdb list 70 is shown in FIG. 26. Its purpose is to update the pdb list 70 before a dismount or close operation on a database file. The minimum block size, MIN_BLKSIZ (Table 3), is stored in a program variable i (block 390). An entry 80 in the pdb list 70, pdb[pool] [i], from the selected memory subpool, pool, corresponding to the selected block size, i, is selected and stored into pi (block 391). If the entry 80, i, is non-zero which indicates that there are other free memory blocks 45 of the selected block size in the frame in the selected memory subpool (block 392), the entry 80 for the pdb list, pdb[pool] [i], is incremented to increase the count of free memory blocks 45 of the selected block size (block 393), the next cache page, pdb[pool] [i], for the selected block size is selected and stored into pi (block 394) and the process (blocks 391–94) is repeated. After all the pdb list entries (pdb[pool] [i]) have been examined, the block size, i, is increased to the next larger memory block size (block 395) and the entire process (blocks 391–95) is again repeated until the maximum block size, MAX_BLKSIZ (Table 3), is exceeded (block 396), whereupon the procedures terminates (block 397).

While the invention has been particularly shown and described as referenced to the embodiments thereof, it will be understood by those skilled in the art that the foregoing and other changes in form and detail may be made without departing from the scope and spirit of the present invention.

TABLE 1

| Block Size (<blksiz>) | Bytes | Paragraphs | Availability Bitmask | Bitmask Bit Position |
|---|---|---|---|---|
| 1 | 16 | 1 | 0x00000010 | 4 |
| 2 | 32 | 2 | 0x00000020 | 5 |
| 3 | 64 | 4 | 0x00000040 | 6 |
| 4 | 128 | 8 | 0x00000080 | 7 |
| 5 | 256 | 16 | 0x00000100 | 8 |
| 6 | 512 | 32 | 0x00000200 | 9 |
| 7 | 1024 | 64 | 0x00000400 | 10 |
| 8 | 2048 | 128 | 0x00000800 | 11 |
| 9 | 4096 | 256 | 0x00001000 | 12 |
| 10 | 8192 | 512 | 0x00002000 | 13 |
| 11 | 16KB | 1024 | 0x00004000 | 14 |
| 12 | 32KB | 2048 | 0x00008000 | 15 |
| 13 | 64KB | 4096 | 0x00010000 | 16 |
| 14 | 128KB | 8192 | 0x00020000 | 17 |
| 15 | 256KB | 16K | 0x00040000 | 18 |
| 16 | 512KB | 32K | 0x00080000 | 19 |
| 17 | 1MB | 64K | 0x00100000 | 20 |
| 18 | 2MB | 128K | 0x00200000 | 21 |
| 19 | 4MB | 256K | 0x00400000 | 22 |
| 20 | 8MB | 512K | 0x00800000 | 23 |

TABLE 2

Frame Header Availability Bitmap

| FEDCBA98 | 76543210 | FEDCBA98 | 76543210 | Bit Position |
|---|---|---|---|---|
| . . . . . . . . | . . . . . . . . | . . . . . . . . | . . . . . . . x | Rebuild Block Flag |
| . . . . . . . . | . . . . . . . . | . . . . . . . . | . . . . . . x . | Reserved |
| . . . . . . . . | . . . . . . . . | . . . . . . . . | . . . . . x . . | Reserved |
| . . . . . . . . | . . . . . . . . | . . . . . . . . | . . . . x . . . | Reserved |
| . . . . . . . . | xxxxxxxx | xxxxxxxx | xxxx. . . . | Block Size Bitmap |
| xxxxxxxx | . . . . . . . . | . . . . . . . . | . . . . . . . . | Reserved |

TABLE 3

| Macro Name | Default Value | Description |
|---|---|---|
| MAX_BYTES | 8MB | Maximum bytes in a frame |
| MIN_BLKSIZ | 1 | Minimum <blksiz> |
| MAX_BLKSIZ | 20 | Maximum <blksiz> |

TABLE 4A

| FLOW DIAGRAM | DESCRIPTION | INPUTS | VARIABLES | OUTPUTS |
|---|---|---|---|---|
| FIG. 14: get a memory block procedure | Find and allocate a memory block, responsive to a memory request. | reqsize: requested number of bytes to allocate<br><br>pool: requested memory subpool to allocate from | demand: minimum <blksiz> to allocate<br><br>supply: <blksiz> of memory block allocation is supplied from | frame: frame number<br><br>page: page number<br><br>offset: offset to memory block allocated |
| FIG. 15: scan pooled page list heads list procedure | Scan pp/heads list for a memory block of size <blksiz>. | demand: minimum <blksiz> to allocate<br><br>pi: pplheads list<br><br>pool: requested memory subpool to allocate from | i: <blksiz> of current pplheads list entry<br><br>supplied from entry | supply: <blksiz> of memory block allocation is<br><br>frame: frame number of frame containing memory block to allocate<br><br>page: page number for selected frame |
| FIG. 16: allocate a memory block procedure | Allocate a memory block of size <blksiz> on specified page. | page: page to allocate from<br><br>demand: minimum <blksiz> to allocate<br><br>supply: <blksiz> of memory block allocation is supplied from | old avail: availability bitmap for frame prior to allocation<br><br>size: number of bytes allocating<br><br>succ: pointer to successor memory block | offset: offset to memory block allocated |

TABLE 4B

| FLOW DIAGRAM | DESCRIPTION | INPUTS | VARIABLES | OUTPUTS |
|---|---|---|---|---|
| FIG. 17: update boffs[] list and BHDRs procedure | Update memory block offset lists and block headers. | demand: minimum <blksiz> to allocate<br><br>supply: <blksiz> of memory block allocation is supplied from<br><br>offset: offset to memory block allocated | kval: minimum <blksiz> to allocate | |

TABLE 4B-continued

| FLOW DIAGRAM | DESCRIPTION | INPUTS | VARIABLES | OUTPUTS |
|---|---|---|---|---|
| FIG. 18: adjust pooled page list heads lists procedure | Modify the ppl during a frame I/O event such as readframe() or swapframe(), or after an alloc_block() or free_block(). | pool: memory subpool to be adjusted<br><br>page: page number of memory block to be adjusted<br><br>x: availmap of frame before allocation or deallocation<br><br>y: availmap of frame after allocation or deallocation | paragraph: number of bytes in minimum <blksiz> memory block<br><br>i: <blksiz> of ppl list entry being adjusted<br><br>j: number of bytes in a memory block of size <blksiz> equalling i<br><br>k: logical AND of frame and paragraph index | |
| FIG. 19: add a page to pooled page list heads list procedure | Add a pplheads list entry during a ppladjust(). | pool: memory subpool to be added to<br><br>page: page number to add to pp/heads list<br><br>i: <blksiz> of pp/heads list to be added to | p: entry in pplheads list | |

TABLE 4C

| FLOW DIAGRAM | DESCRIPTION | INPUTS | VARIABLES | OUTPUTS |
|---|---|---|---|---|
| FIG. 20: remove a page from pooled page list heads list procedure | Remove a ppl list entry during ppladjust(). | pool: memory subpool to remove from<br><br>page: page number to remove from ppl list<br><br>i: <blksiz> of ppl list to remove from | next: page number of next page in cache list<br><br>prev: page number of previous page in cache list | |
| FIG. 21: free a memory block procedure | Free a memory block at offset <offs> on the specified page. | page: page to free a memory block from<br><br>offset: offset of memory block to be freed | oldavail: availability bitmap for frame before deallocation<br><br>size: number of bytes of memory block being freed or deallocated from merge buddy blocks procedure (FIG. 22) | |

TABLE 4C-continued

| FLOW DIAGRAM | DESCRIPTION | INPUTS | VARIABLES | OUTPUTS |
|---|---|---|---|---|
| FIG. 22: merge buddy blocks procedure | Merge buddy memory blocks. | FHDR: pointer to frame header<br><br>offset: offset of original memory block to be freed | kval: memory block size of memory block to free<br>kval: memory size: number of bytes for memory block of size kval<br>buddy block<br>buddoffs: offset to the buddy memory block | BHDR: pointer to memory block header<br><br>block size of memory block last freed according to system<br><br>size: number of bytes for memory block of size kval<br>offset: offset of memory block last freed |

TABLE 4D

| FLOW DIAGRAM | DESCRIPTION | INPUTS | VARIABLES | OUTPUTS |
|---|---|---|---|---|
| FIG. 23: unlink a memory block procedure | Unlink memory block header links to a memory block. | FHDR: pointer to frame header<br><br>buddoffs: offset to the buddy memory block | succ: pointer to successor buddy memory block<br><br>pred: pointer to predecessor buddy memory block | |
| FIG. 24: scan Pooled disk block list procedure | Scan the pdb list for a memory block of size <blksiz>. | demand: minimum <blksiz> to allocate<br><br>pool: requested memory subpool to allocate from | i: <blksiz> of current pdb list entry<br><br>ci: pdb list entry | frame: frame number of frame containing memory block of requested size |
| FIG. 25: adjust pooled disk block list procedure | Modify the pdb list during a frame I/O event such as readframe(), swapframe() or rollback(). | pool: memory subpool to be adjusted<br><br>avail: availmap of frame<br><br>incr: delta to adjust by (±1) | i: <blksiz> of pdb list entry to adjust | |
| FIG. 26: update pooled disk block list procedure | Update the pdb list from the pplheads list before reading or writing a frame to disk. | pool: memory subpool to be adjusted | i: <blksiz>of pdb list entry to adjust<br><br>pi: pdb list entry | |

What is claimed is:

1. A memory management system for a memory, the memory manager system and memory comprising:

a storage device organized into at least one file comprising frames of stored data for swapping into the memory;

the memory comprising numbered pages for storing swapped frames of the stored data from the storage device, a page list heads list comprising list head entries, each said list head entry identifying the numbered page containing free memory blocks of storage space, at least one of said list head entries storing a page number identifying one of the numbered pages that contains one of the free memory blocks, and a blocks list for each frame comprising at least one blocksize entry, each such blocksize entry containing a count of frames in the storage device that contain available storage space of a given size; and a processor comprising means using the page number stored in the at least one list head entry for allocating the memory blocks responsive to a memory request, and means using the blocks list for allocating available storage space responsive to the memory request.

2. A memory management system according to claim 1, wherein the memory further comprises a page list for each numbered page comprising at least one page entry, each such page entry storing a page number identifying another of the numbered pages that contains another of the free memory blocks, the processor further comprising means for replacing at least one list head entry with a page number from one said page list.

3. A method for allocating requested memory blocks in a system comprising a storage device organized into at least one file comprising data frames of stored data for swapping into a memory, the memory comprising numbered pages for storing swapped frames of the stored data from the storage device, a page list heads list comprising at least one list head entry, each said entry identifying one of said numbered pages that has free memory blocks of a predetermined block size, each entry storing a page number corresponding to one of the numbered pages in the memory containing a data frame from the storage device having a free memory block of the predetermined block size, and a blocks list for each data frame comprising at least one blocksize entry, each such blocksize entry containing a count of data frames in the storage device that contain available storage space of a given block size, the method comprising the steps of:

allocating the requested memory blocks from the memory using the page number stored in the at least one list entry in response to a memory request; and when said previous allocating step is not successful, allocating the requested memory blocks from the available storage space in the storage device using the blocks list in response to a memory request.

4. The method of claim 3 wherein the memory further comprises a page list for each numbered page comprising at least one page entry, each such page entry storing a page number identifying another of the numbered pages that identifies another of the free memory blocks, the method comprising replacing at least one list head entry with a page number from one said page list.

5. A method using a computer for managing a memory organized into a plurality of layers, comprising:

generating a memory request for a fixed amount of memory in a service layer responsive to an application program;

receiving, in a memory manager layer, the memory request, the memory manager layer comprising a cache containing a plurality of pages for storing frames of data;

scanning at least one page list for a page entry, the page list containing a plurality of page entries, each page entry identifying one of the plurality of pages having a free memory block;

scanning a disk block list for a non-zero frame count, the disk block list containing a count of frames not contained in the cache having a free memory block of a given size; and allocating free space by locating a block of free space in a memory-resident data frame at least as large as the fixed amount of memory in constant time and returning an in-memory address for the located block to the service layer.

6. A method according to claim 5, further comprising scanning a list of frame headers for a frame having a free memory block at least as large as the fixed amount of memory, each such frame header comprising an availability bitmap indicating that the corresponding frame has at least one free memory block.

7. A method according to claim 6 further comprising performing a comparison operation on the availability bitmap to determine whether a memory block at least as large as the fixed size is free in the corresponding frame.

8. A method using a computer for allocating a memory block having a requested size in constant time, the computer comprising a cache comprising numbered pages for storing swapped frames of stored data and a page list heads list comprising at least one list head entry, each numbered page containing memory blocks for data storage, each such list head entry storing a page number identifying the first of the numbered pages that contains one of the free memory blocks, each frame comprising storage blocks of storage space, comprising the steps of:

scanning the page list heads list responsive to a memory request to obtain from the one list head entry that stores a page number matching the first numbered page that contains the one memory block having free storage space at least as large as the requested size;

determining a memory block offset for the one memory block relative to the beginning of the frame;

maintaining a disk block list for each frame comprising at least one count entry, each such count entry containing a count of frames that contain available storage blocks of a given block size;

performing at least one of the steps of allocating or deallocating the one memory block by updating the page list heads list;

examining the disk block list after the step of allocating when none of the frames in memory have free space: and allocating one of the storage blocks responsive to the memory request.

9. A method according to claim 8, further comprising the steps of:

maintaining a page list for each numbered page comprising at least one page entry, each such page entry storing a page number identifying another of the numbered pages that contains another of the free memory blocks; and updating the page list heads list after the step of allocating or deallocating by replacing the page number stored in the one list head entry with the page number stored in the one page entry.

10. A method according to claim 8, wherein each of the memory blocks has a proportionate size and the page list heads list is organized according to the proportionate sizes.

11. A method using a computer for managing a partitioned memory, the computer comprising a memory connected to a storage device, comprising the steps of:

organizing the storage device into at least one file comprising numbered data frames of stored data for swapping into the memory, each frame in the at least one file comprising storage blocks of storage space;

partitioning the memory into a cache comprising numbered pages for storing swapped frames, each numbered page containing data frames that contain memory blocks of storage space;

forming a page list heads list comprising at least one list head entry, each such list head entry storing a page number identifying a first of the numbered pages that contains one of the free memory blocks of a given block size;

maintaining a disk block list for each frame comprising at least one count entry, each such count entry containing a count of frames that contain available storage blocks of a given block size;

allocating the one memory block responsive to a memory request by looking up the numbered page identified by the page number stored in the one list head entry;

examining the disk block list after the step of allocating when none of the memory blocks have free space; and allocating one of the storage blocks responsive to the memory request.

12. A method according to claim 11, further comprising the steps of:

maintaining a page list for each numbered page comprising at least one page entry, each such page entry storing a page number identifying another of the numbered pages that contains another data frame that contains free memory blocks; and updating the page list heads list after the step of allocating by replacing the page number stored in the one list head entry with the page number stored in the one page entry.

13. A method according to claim 11, wherein each of the memory blocks has a proportionate size and the page list heads list is organized according to the proportionate sizes.

14. A method using a computer for managing a memory, the computer comprising a storage means for storing a file comprising a plurality of frames and a cache connected to the storage means for storing frames swapped into the memory in pages, comprising the steps of:

updating a page list in the memory comprising a plurality of page entries, each such page entry containing a number identifying one of the pages that is storing a frame from the plurality of frames having free space of a given block size when a memory request is processed; and updating a disk block list in the memory comprising a plurality of count entries, each such count entry containing a count of frames in the storage means that is storing a frame from the plurality of frames having free space of the given block size when a memory request is processed.

15. A method according to claim 14, further comprising the steps of:

receiving a memory request for freeing a fixed size of allocated space; and deallocating the allocated space by adjusting at least one of the page list and disk block list.

16. A method according to claim 14, further comprising the steps of:

receiving a memory request for allocating a fixed amount of memory;

locating free space in the memory at least as large as the fixed size by examining the page list and the disk block list; and allocating the free space by returning an address for the free space and adjusting at least one of the page list and disk block list.

17. A method according to claim 16, wherein each frame comprising a plurality of memory blocks having a predetermined size and the free space is a memory block, further comprising the steps of:

organizing the page list according to each predetermined size; and organizing the disk block list according to each predetermined size.

18. A method according to claim 17, wherein each predetermined size is a power of two.

19. A method according to claim 16, wherein the step of locating further comprises the steps of:

scanning the page list when the memory request is not as large as a page; and allocating a new frame when the memory request is at least as large as a page.

20. A method according to claim 19, further comprising the steps of:

scanning the disk block list when no page entry is found; and allocating a new frame when no block entry is found.

* * * * *

UNITED STATES PATENT AND TRADEMARK OFFICE
CERTIFICATE OF CORRECTION

PATENT NO.    : 5,835,959
DATED         : November 10, 1998
INVENTOR(S)   : Michael W. McCool and Scott J. Kurman It is certified that error appears in the above-identified patent and that said Letters Patent is hereby corrected as shown below:

Column 1,
Line 33, after "selected frames" delete "into".

Column 2,
Lines 28 and 30, replace "only" with -- Only -- (both occurrences).

Column 5,
Line 36, replace "behavior)." with -- behavior). --.

Column 12,
Line 63, after "block size" delete "in".

Column 14,
Line 15, replace "alloc_blocko" with -- alloc_block( ) --.

Column 18,
Line 23, replace "terminates" with -- terminate --.

Column 19,
Table 4A,
Line 11 of the Table, in the DESCRIPTION column replace "pp/heads" with -- pplheads --.
Line 15 of the Table, in the INPUTS column delete "pi: pplheads list" and move to replace "supplied from" in the VARIABLES column to read -- pi: pplheads list entry --.
Line 15 of the Table, in the VARIABLES column delete "supplied from" and insert in the "OUTPUTS" column under "allocation is" to read -- allocation is supplied from --.

Column 21,
Table 4B,
Lines 26, 28 of the Table, in the INPUTS column replace "pp/heads" with -- pplheads -- (both occurrences).
Table 4C,
Line 16 of the Table, in the INPUTS column delete "before" and insert in the "VARIABLES" column under "bitmap for frame" to read -- bitmap for frame before deallocation --.

UNITED STATES PATENT AND TRADEMARK OFFICE
CERTIFICATE OF CORRECTION

PATENT NO. : 5,835,959
DATED : November 10, 1998
INVENTOR(S) : Michael W. McCool and Scott J. Kurman It is certified that error appears in the above-identified patent and that said Letters Patent is hereby corrected as shown below:

Column 23,
Table 4C,
Lines 5, 10 of the Table, in the VARIABLES column delete "kval: memory" (second occurrence) and "buddy block" and insert in the "OUTPUTS" column to read -- kval: memory block size of memory block last freed according to buddy block system --.
Line 16 of the Table, in the OUTPUTS column insert a space between "size kval" and "offset: offset of memory block last freed".

Column 26,
Line 45, replace "free space:" with -- free space; --.

Signed and Sealed this

Thirtieth Day of July, 2002

Attest:

JAMES E. ROGAN
Attesting Officer         Director of the United States Patent and Trademark Office